United States Patent
Kasmir

(10) Patent No.: US 11,412,187 B2
(45) Date of Patent: Aug. 9, 2022

(54) BATTERYLESS VIDEO DOORBELL

(71) Applicant: Alarm.com Incorporated, Tysons, VA (US)

(72) Inventor: Seton Paul Kasmir, San Diego, CA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 17/076,727

(22) Filed: Oct. 21, 2020

(65) Prior Publication Data

US 2021/0120212 A1 Apr. 22, 2021

Related U.S. Application Data

(60) Provisional application No. 62/923,944, filed on Oct. 21, 2019.

(51) Int. Cl.
| | |
|---|---|
| *H04N 7/18* | (2006.01) |
| *H04N 5/232* | (2006.01) |
| *G08B 3/10* | (2006.01) |
| *H02M 7/06* | (2006.01) |

(52) U.S. Cl.
CPC ............. *H04N 7/183* (2013.01); *G08B 3/10* (2013.01); *H04N 5/23241* (2013.01); *H02M 7/06* (2013.01)

(58) Field of Classification Search
CPC .... H04N 7/183; H04N 5/23241; H04N 7/186; H04N 5/232; H04N 5/23206; H04N 5/232411; G08B 3/10; H02M 7/06
See application file for complete search history.

(56) References Cited

U.S. PATENT DOCUMENTS

| | | | |
|---|---|---|---|
| 8,786,435 B2 | 6/2014 | Barnett et al. | |
| 9,978,228 B2 | 5/2018 | Wilson et al. | |
| 10,270,971 B2 | 4/2019 | Siminoff et al. | |
| 10,355,730 B1 | 7/2019 | Zalewski et al. | |
| 10,567,711 B1 | 2/2020 | Skeoch et al. | |
| 10,681,518 B1 | 6/2020 | Zalewski et al. | |
| 10,803,719 B1 | 10/2020 | Skeoch et al. | |
| 10,938,294 B1* | 3/2021 | Chin | H04N 5/232411 |
| 2008/0297339 A1* | 12/2008 | Mathews | H04L 12/10 |
| | | | 340/538.16 |
| 2015/0161856 A1* | 6/2015 | Wilson | G08B 3/10 |
| | | | 340/392.1 |
| 2019/0306432 A1* | 10/2019 | Chen | H04N 5/2252 |
| 2021/0199494 A1* | 7/2021 | Miles | G01H 11/06 |

* cited by examiner

*Primary Examiner* — Jared Walker
(74) *Attorney, Agent, or Firm* — Fish & Richardson P.C.

(57) ABSTRACT

A circuit is described for powering a video doorbell in signal communication with a chime that outputs audio. The circuit includes a switch coupled to a set of input power wires that supply power to the circuit from a source. The switch is operable to switch between: i) a first path of the circuit that supplies power to the video doorbell using the input power wires and ii) a second path of the circuit that supplies power to the chime using the input power wires. The circuit includes a controller that controls the switch to iteratively switch between the first path and the second path based on a timing metric. In response to detection of an object by the video doorbell, the iterative switching between the first path and the second path concurrently powers the video doorbell and the chime without relying on battery power at the video doorbell.

20 Claims, 19 Drawing Sheets

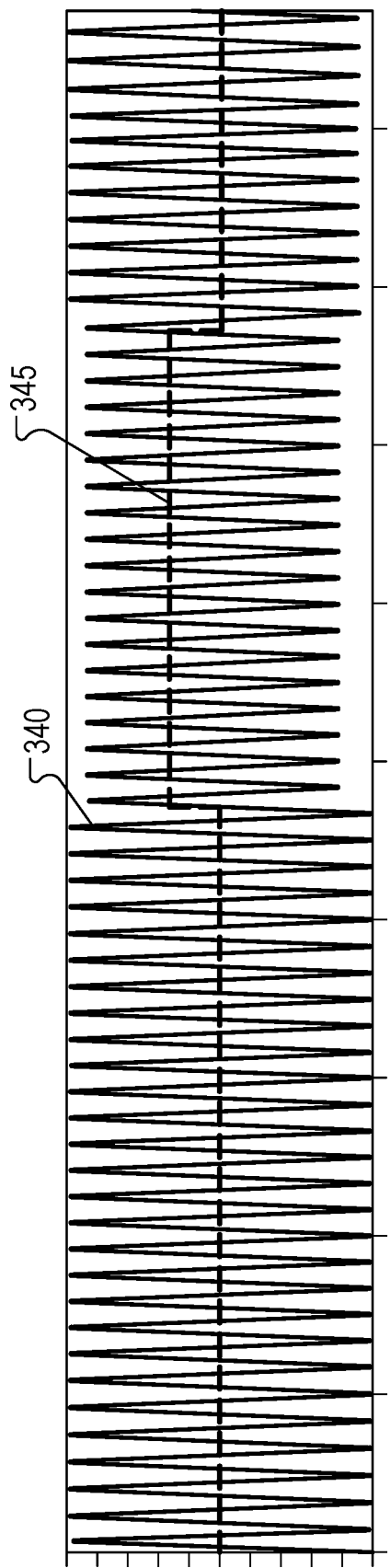
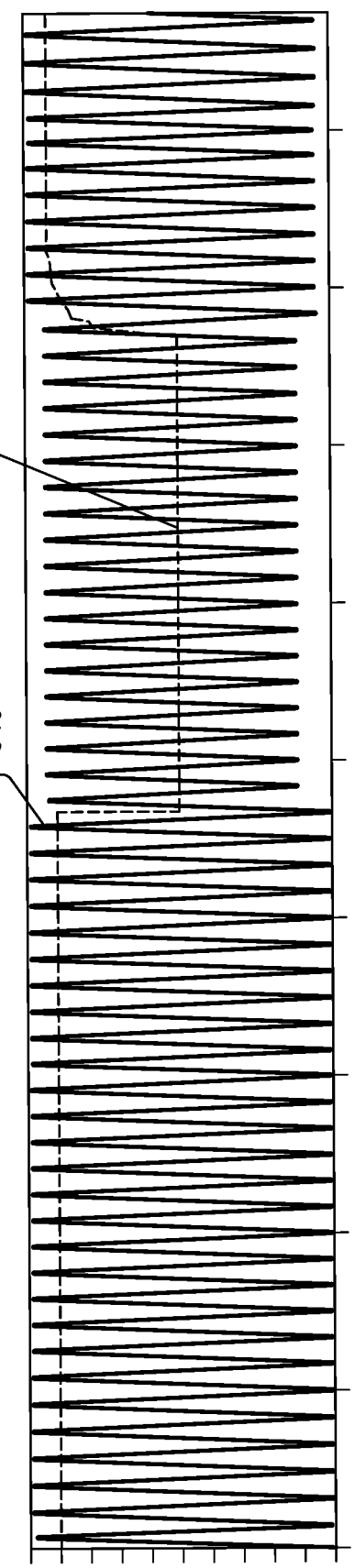

BATTERYLESS VIDEO DOORBELL

CROSS REFERENCE TO RELATED APPLICATION

This application claims the benefit of U.S. Provisional Application No. 62/923,944, filed on Oct. 21, 2019, which is incorporated herein by reference in its entirety.

FIELD

This specification relates to circuitry used in doorbells for a property or residence.

BACKGROUND

Doorbells and related monitoring devices are often used at various types of properties, such as a home or commercial business. These doorbells and related devices can be implemented in different ways when installed at a particular location of the property. Some doorbells include hardware circuitry that provide different types of monitoring and control functionality. The functionality afforded by these doorbells, and their respective hardware circuitry, can include wireless and audio signal transmissions. These signal transmissions can be leveraged to monitor persons or items at a property as well as to obtain visual information about the items and communicate with persons at property.

The video doorbell may be a newer type of Wi-Fi video doorbell that replaces the conventional doorbell buttons typically found on homes or properties. Consumers and service providers want to reuse the existing doorbell components and wiring to save installation time and cost. Installation uses the existing wiring, alternating-current (AC) transformer, and an indoor chime. However, an installer or home owner often will not know the whereabouts and cannot locate the existing doorbell's AC transformer. Also, use of existing wiring and other components such as the transformer or battery power may not offer adequate energy profiles to meet the unique power requirements of newer video/Wi-Fi doorbells.

SUMMARY

This document describes techniques for improved hardware circuitry of a video doorbell in signal communication with a chime (e.g., mechanical or electrical) that outputs audio when a button on the video doorbell is pressed. The hardware circuitry is configured to provide power to a video doorbell without reliance on battery power. The circuit includes a switch and a controller that controls a timing of the switch to short an input to the video doorbell. For example, the controller controls the switch to iteratively switch between a first path of the circuit that supplies power to the video doorbell and the second path of the circuit that supplies power to the chime. This iterative switching is used to concurrently power the video doorbell and the chime without relying on battery power at the video doorbell, in response to the button on the video doorbell being pressed.

Other implementations of this and other aspects include corresponding systems, apparatus, and computer programs, configured to perform the actions of the methods, encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented in particular embodiments to realize one or more of the following advantages.

As noted above, the described techniques can be used to provide power to a video doorbell without reliance on battery power, thereby eliminating the need for an internal battery of a video doorbell as well as a battery that may be external to the video doorbell. Eliminating the internal battery in a video doorbell can provide several benefits. First, removing the battery saves on battery cost. Removing the battery also removes extraneous components associated with a battery heater as well as other component circuitry that supports charging and reading a charge status of the battery. Second, safety, handling, and shipping concerns are minimized based on the removal of a rechargeable battery (e.g., lithium battery), which often require specialized handling and care. For example, eliminating the battery reduces product liability concerns due to battery's ability to catch fire.

Third, video doorbells often operate outdoors and in environmental conditions such as extreme heat and extreme cold. Batteries do not react or operate well in cold weather. For example, at or below just 32 degrees Fahrenheit (0 degrees Celsius) a battery can be damaged and its output power is significantly reduced and cannot be relied upon to supply enough power during the ringing process. Batteries can sustain damage if charged during periods of temperatures below 32° F. Damage can also occur if the battery is operated at hot temperatures. In some instances, the internal temperature of a doorbell can about 15-25° C. warmer than the outside temperature. Operating at hot temperatures can cause the internal liquid of a battery to become a gas which then expands or bloats, increases the potential for damage or injury.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIGS. 3B, 3C, 3D illustrate an example voltage diagram for a transformer at the property.

Like reference numbers and designations in the various drawings indicate like elements.

DETAILED DESCRIPTION

Figure 1:
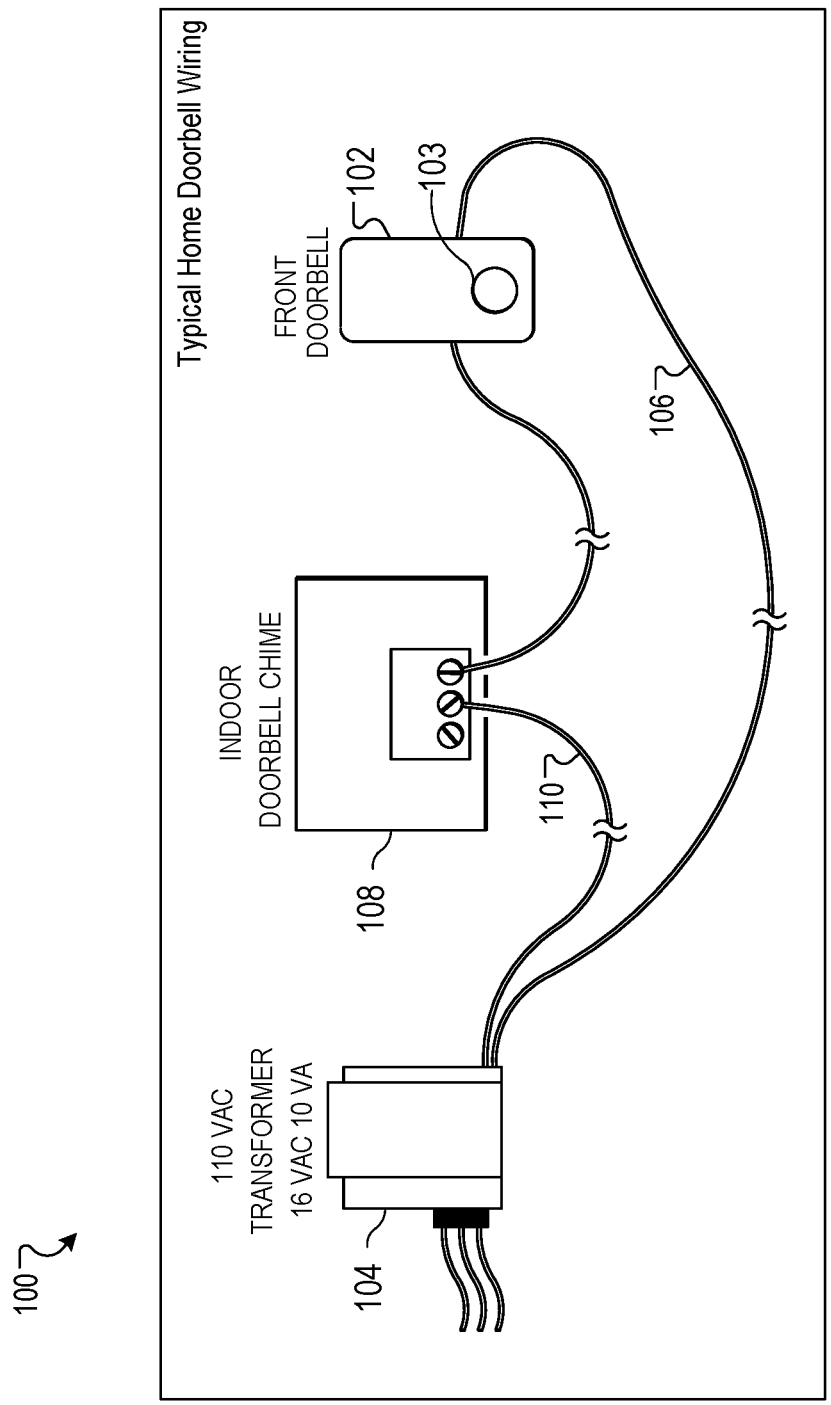
FIG. 1 illustrates an example home doorbell wiring diagram.

FIG. 1 illustrates an example home doorbell wiring diagram 100. As shown, the front doorbell 102 has a button 103 which is a mechanical switch that may be mounted on the outside of a property, such as a house (or other structure), and is connected to both a transformer 104 by one wire 106 and an indoor chime 108. In some cases, front doorbell button 103 is referred to alternatively as switch 103. The indoor chime 108 can be a mechanical chime or an electronic chime. The front doorbell button 103 is open until a person presses it. In other words, the front doorbell button 103 corresponds to a normally open switch of a circuit in the front doorbell, where the switch closes in response to the front doorbell button 103 being pressed or depressed by a user. Pressing the front doorbell button 103 closes the switch and completes a portion of the doorbell circuit so that power 110 supplied by the transformer 104 is applied to the indoor chime 108. This application of transformer power to the indoor chime 108 causes the familiar doorbell sound such as "ding dong."

Figure 2:
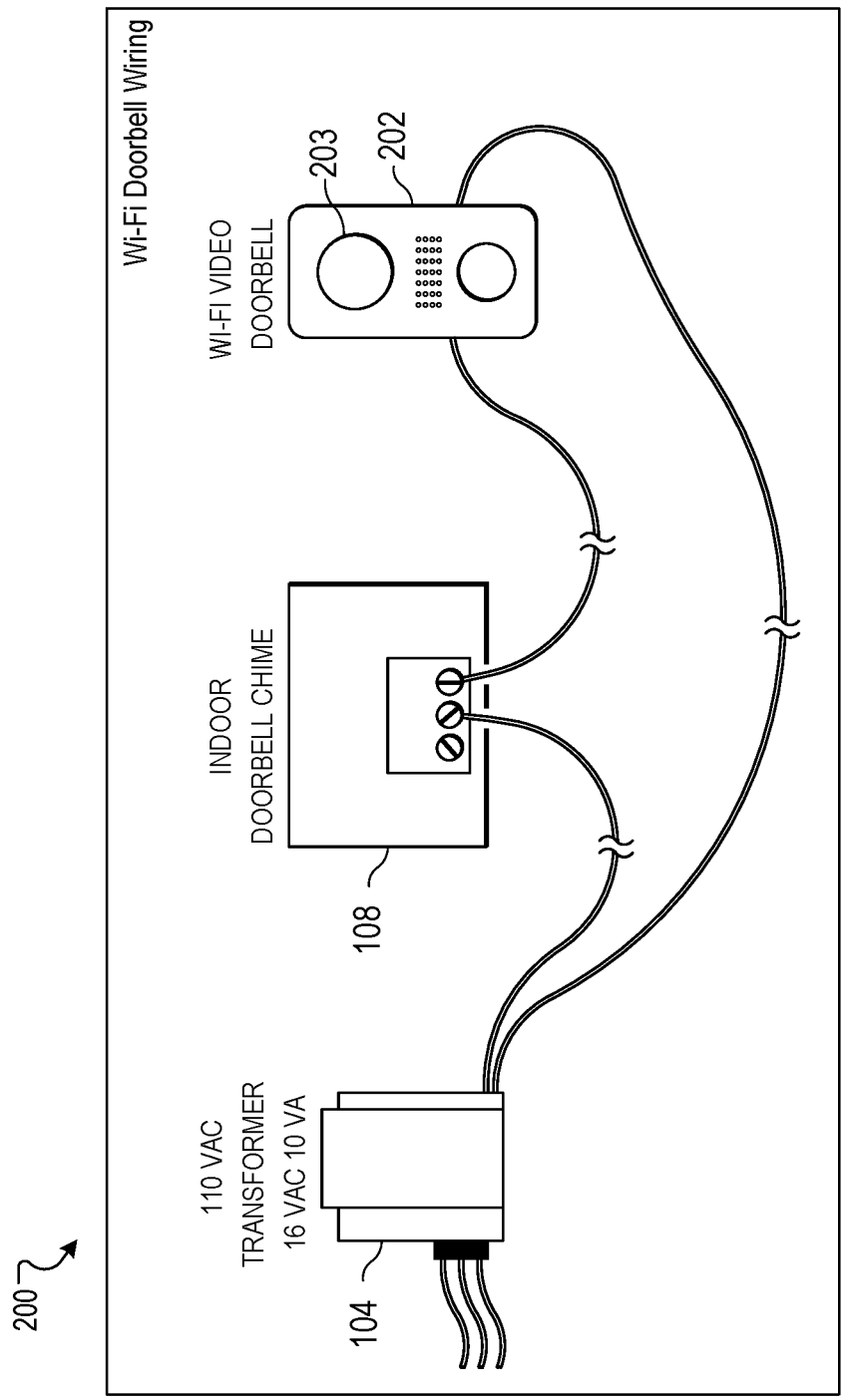
FIG. 2 illustrates an example home video doorbell wiring diagram where a video doorbell replaces a mechanical doorbell switch mounted on a property.

FIG. 2 illustrates an example home video doorbell wiring diagram 200 where a video doorbell 202 (e.g., a Wi-Fi video doorbell) replaces the mechanical switch/button 103 of the front doorbell 102 mounted on the property and can draw power from the transformer 104 via two wired output connections. Video doorbell 202 is capable of connecting to a network or the Internet via a Wi-Fi signal, an Ethernet connection, or both. In the example of FIG. 2, one transformer output connection travels through wiring resistance inside the chime of a mechanical chime 108 and the other output is connected by a wire 106 directly to the transformer 104. The mechanical chime resistance may be 6-8 ohms. The video doorbell 202 mimics the mechanical switch 103 when its button is pressed by shorting the two external wires together which applies some or all of the power output to the mechanical chime 108, making the ding dong sound. When the doorbell 202 is not ringing, the circuit is not open like the example switch circuit of the mechanical front doorbell 102. Instead, doorbell 202 uses some amount of power that is lower than an amount of power required to ring in indoor chime 108.

A mechanical chime 108 rings by directly applying a voltage across the mechanical chime and a current through the chime. In some implementations, it consists of an AC power voltage of 16 VAC RMS and a current about 1 AMP RMS. It is approximate because the power source is a transformer which does not regulate its output in terms of voltage and current.

A mechanical chime ding-dong sound that most users are used to hearing from the past is as described. The ding happens when upon first pressing the mechanical doorbell button and the AC solenoid inside the Chime is energized throwing the plunger into one bell (ding). The user can continue to hold down the button for a moment or other time period, but as soon as the button is released there is no more energy applied to the chime so the spring inside causes the plunger to return to its natural position but "overshoots" a little so the plunger hits the other bell inside the chime (dong). The video doorbell 202 simulates the human button press by shorting the input power wires together just like pressing on the mechanical button. From the point at which the user hears the Ding to just before the Dong, the wires are shorted together. Ding may be a quarter of a second to half or may be a full second. Again, when the wires are shorted there is no power available to the video doorbell.

The electronic chime 108 is rung by a video doorbell similarly but with slightly different timing. In this case, the electronic chime requires power to run its electronics and speaker. When an electronic chime detects an AC waveform that is of significant enough amplitude, it will play its electronic chime sound. A video doorbell mimics this by shorting its input so all of the transformer's AC voltage is applied to the electronic chime 108. This power must be applied for the entire time it takes to play a particular chime sound which is between about 2 and 8 seconds. If the video doorbell powers the electronic chime a bit longer than the sound, it may start to repeat the sound so getting the timing correct is important. If the power to the electronic chime is too short, then the chime sound may sound like an incomplete sound of typical chime sounds.

In some implementations, a switch may not be used to create the short. Instead, an electronic component such as a transistor, optical isolator, or triac may be located somewhere else and perform the same function.

When the video doorbell shorts (using Switch 1 in FIG. 4 described below) its input to ring any type of chime, there is no power going into the doorbell 202. Video doorbells that are powered externally as shown in FIG. 2 lose the applied power from the transformer during the process of ringing the chime. To properly ring the chime, they mimic the mechanical doorbell by shorting their two input wires together. To operate without applied power, these doorbells use an internal battery. For a mechanical chime, the battery supplies power during the ring time of about 0.25 seconds. An electronic chime requires the battery to supply power much longer, up to about 8 seconds.

Figure 3A:
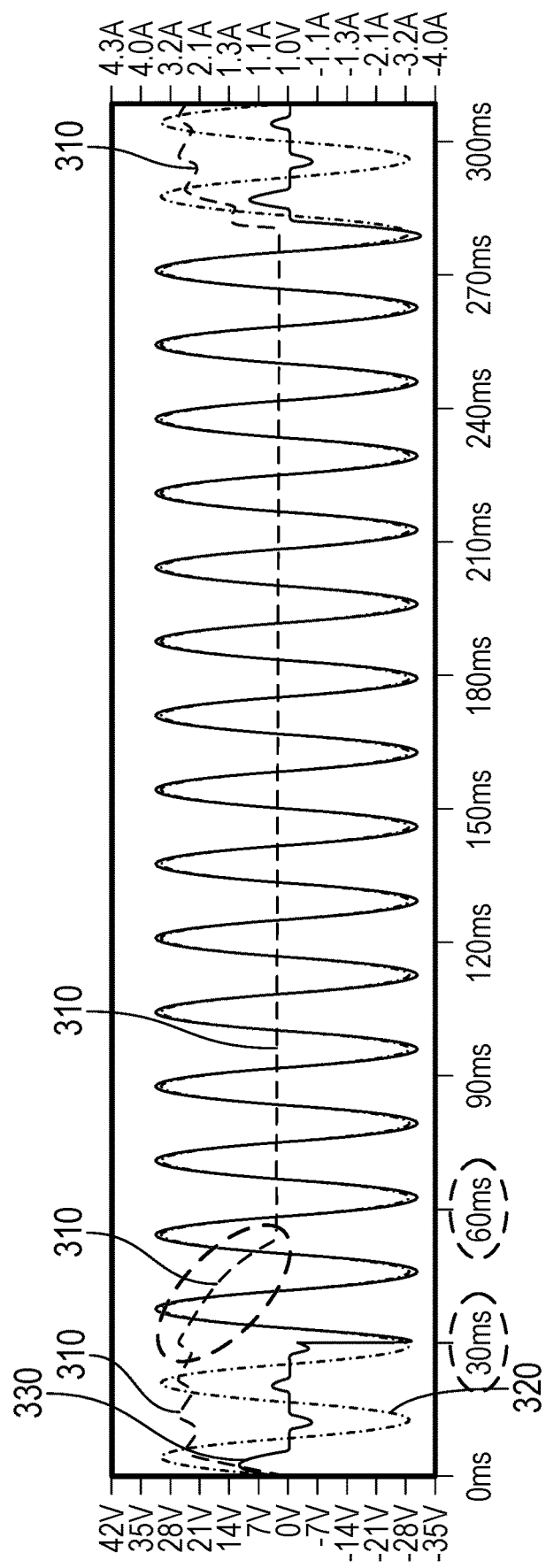
FIG. 3A illustrates an example voltage diagram for an input capacitor at a first stage of a power supply.
Figure 3D:
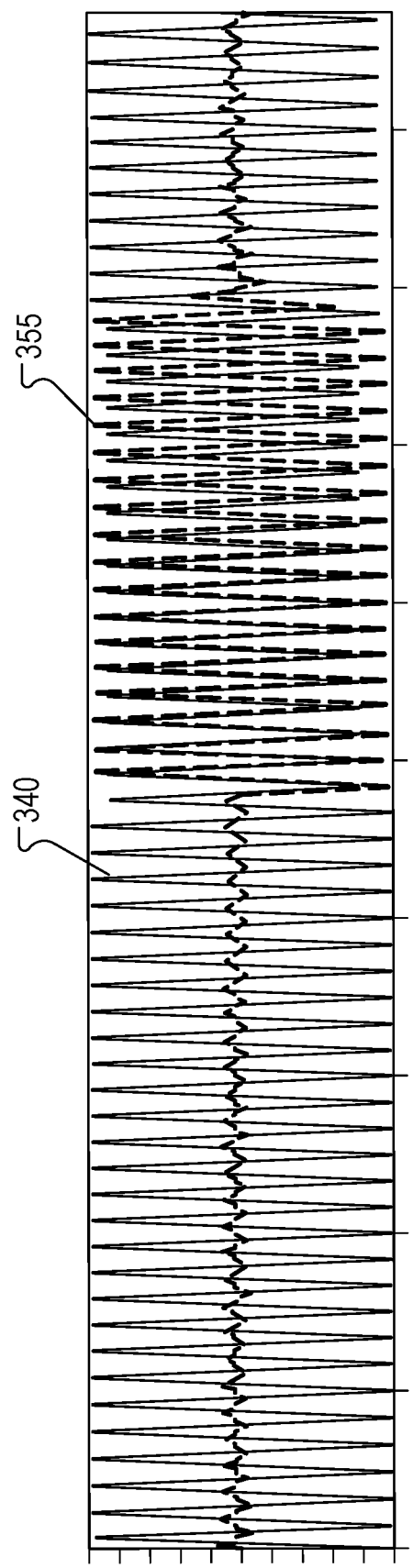
Figure 3E:
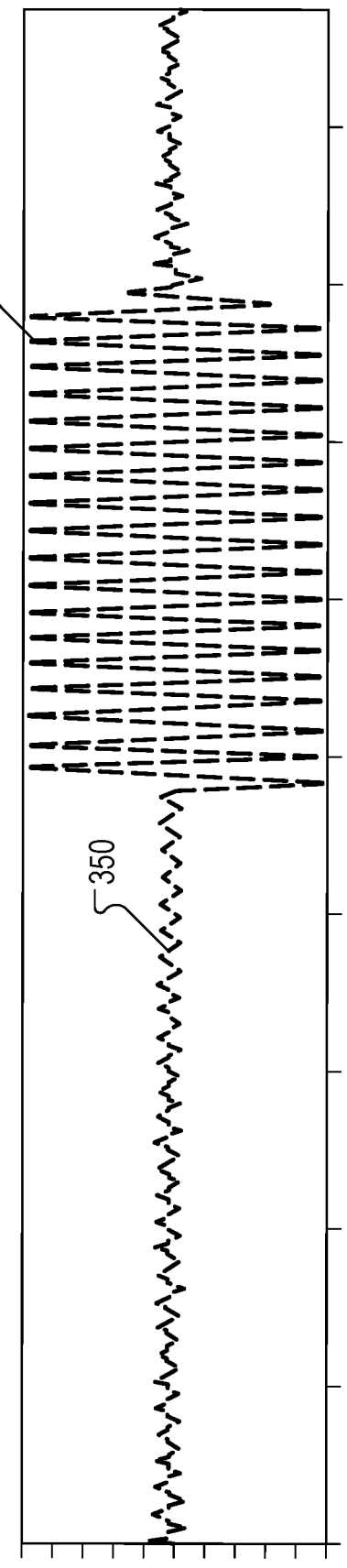
FIG. 3E illustrates an example voltage diagram for a transformer at the property.

FIG. 3A illustrates an example voltage diagram associated with the first stage power supply of the circuit. The diagram trace 310 that shows voltage at the input capacitor (C1 in FIG. 4), a trace 320 that shows a voltage of transformer 104 and a trace 330 that shows a current of at least the chime 108. FIGS. 3B, 3C, 3D illustrate an example voltage diagram for a transformer at the property. A transformer voltage 340 which drops during a ring cycle is shown in the example of FIG. 3B. Feature 345 in FIG. 3B is an indicator of a typical 300 millisecond (ms) ring time of an electronic doorbell chime. In the example of FIG. 3C, feature 350 is a voltage on capacitor C1. This voltage is drained when ringing the chime since it has no more power going into a circuit of the doorbell. The voltage at capacitor C1 is drained by a first stage buck converter as described below with reference to the example of FIG. 4. During the time it is drained a battery supplies the power. FIG. 3D illustrates an example diagram indicating the transformer voltage 340 and the current 355 through the chime. FIG. 3E illustrates an example diagram indicating only the current 355 through the chime.

Figure 4:
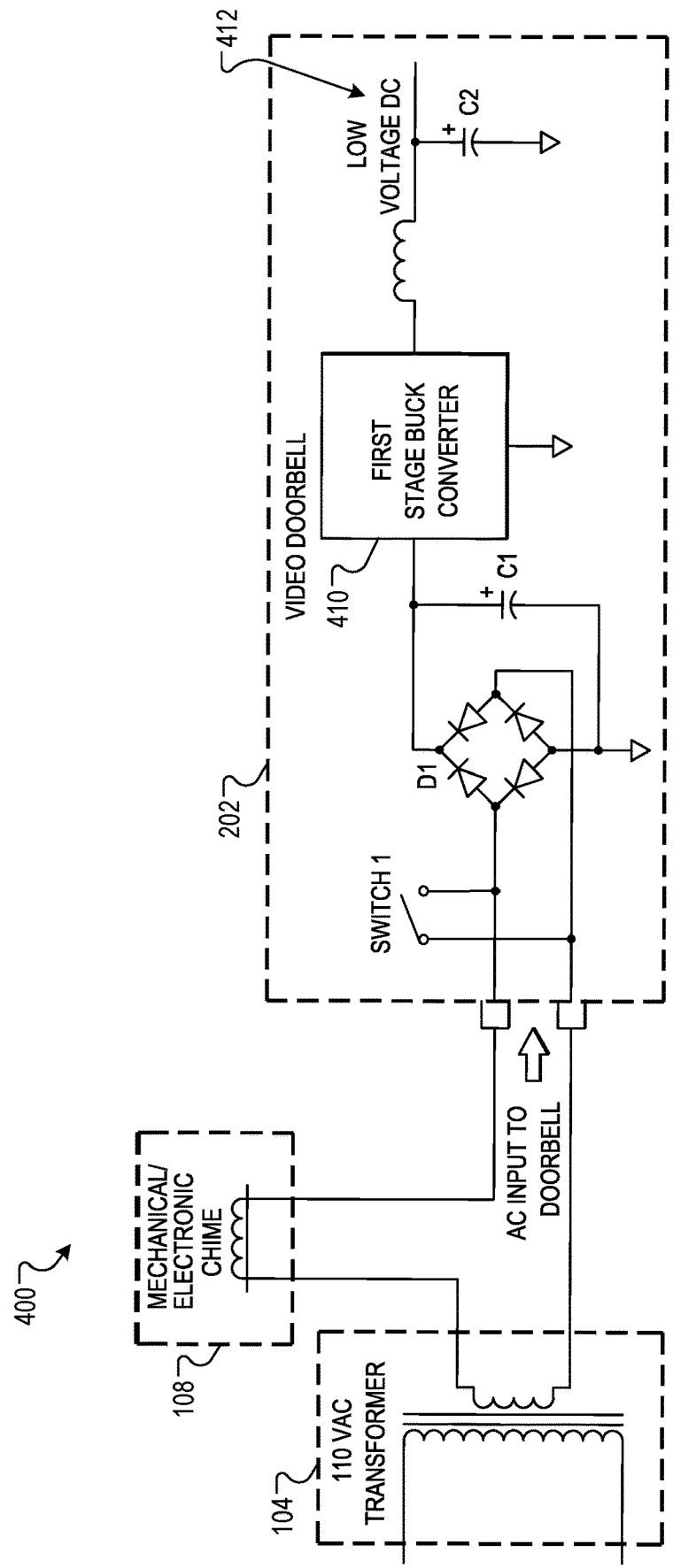
FIG. 4 illustrates an example circuit schematic of a video doorbell, mechanical chime, and transformer.

FIG. 4 illustrates an example circuit schematic 400 of a video doorbell 202, chime 108, and transformer. Capacitor C1 stores the energy for the entire doorbell 202, after conversion from AC to DC. V=Q/C (Q is the stored charge and C is the capacitance of the capacitor). In the example of FIG. 4, the AC input signal generated by the transformer 104 is supplied to a bridge rectifier D1 of the circuit. A first stage buck converter 410 of the circuit outputs a lower voltage DC signal 412, typically under 6 volts so that downstream buck power supplies can create DC voltages (e.g., power signal) required for providing power to the internal components of the video doorbell 202.

Referring again to the example of FIG. 3A, trace 320 is the transformer voltage and trace 330 is the current through the chime 108. In FIG. 3A, at 30 milliseconds (ms), the doorbell 202 shorts its input wires to ring the chime 108. FIG. 3A further shows that a first stage power supply's stored input voltage on C1 drops to 0 volts, which signifies no more energy to operate, in about twenty to thirty milliseconds. This is less time than the quarter of a second it takes to ring a chime 108.

The discussion below describes example systems and methods for using a Power Supply first stage. These example systems and methods may be combined in any combination with any of the systems and methods described above and herein.

In some implementations, the video doorbell may operate the electronic chime without a battery. In some instances, a method of operating a video doorbell during the 2 to 8 seconds entails shorting the power input and relying on its battery to operate. There are other methods of ringing an electronic chime that involve alternative methods of powering the chime and the doorbell during this period of time. Since the transformer has enough power to power both the chime and the doorbell simultaneously, there are power sharing methods between the chime and the video doorbell which reduces the doorbell dependency on an internal battery to sustain operation while ringing.

An example power sharing technique between the chime and video doorbell may include pulsing, either synchronized or not synchronized. Another example power sharing technique between the chime and the video doorbell may include shorting to ring the electronic chime. In this instance, shorting may include dropping the voltage down to a level that allows voltage and power splitting between the electronic chime and the video doorbell.

In one implementation, the circuit of the doorbell short the two input wires together, for example, by switching switch or transistor of the circuit on and off. The AC signal routed by the input wires can supply current in both directions. The described power sharing technique can involve creating a timed pulse signal that controls a timing of the switching of the switch. In some implementations, the video doorbell system or circuit includes a controller (e.g., a microcontroller or microprocessor) that controls the switch to iteratively switch between: i) a first path of the circuit that supplies power to the video doorbell 202 using a set of input power wires and ii) a second path of the circuit that supplies power to the chime 108 using the set of input power wires.

The controller controls and iteratively switches the switch to concurrently power the video doorbell and the chime without relying on battery power at the video doorbell, in response to the button on the video doorbell being pressed. The controller can control the switch based on a timing metric that specifies a timing of when to switch the switch on (open) and off (closed). In some implementations, the controller samples the AC input signal generated by the transformer. For example, the controller can sample the AC input signal using a detector, which is described in more detail below with reference to the example of FIG. 6.

Figure 12:
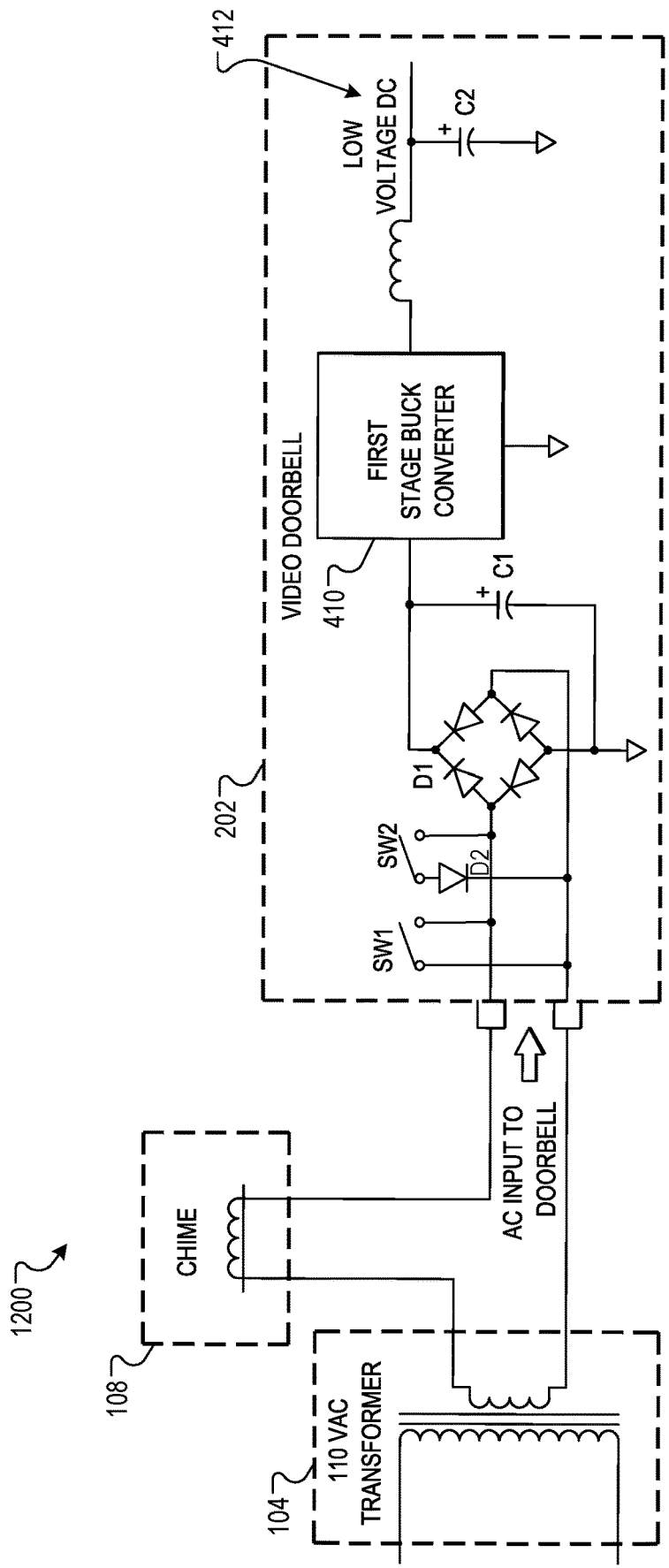
FIG. 12 is an example circuit schematic of a video doorbell with a switch and an additional diode.

Referring briefly to FIG. 12, a circuit 1200 is configured to perform an incomplete shorting of the AC input signal. For example, the circuit can include a switch configuration that includes a switch SW2 and a diode D2. The switch SW2 and the diode D2 are used to short the input to the doorbell 202 in one direction, or one-half of a cycle of the AC signal, such that some or all the power and voltage goes to the chime 108. During the other half of the cycle some or all the power goes to the video doorbell 202. In some implementations, effectively using the power associated with each half of the signal cycle may depend on a switching speed of a bypass circuit installed at the chime 108. This technique of incomplete (half) shorting of the AC input signal may be performed without the timing metric or a sampling of AC input signal. In some cases a normal complete short on the input is performed for a mechanical chime 108, whereas the AC signal is detected and sampled for an electronic chime 108. For example, the AC signal may be sampled before using a technique of diode shorting the input voltage to initiate automatic power sharing between the video doorbell and the chime 108.

In the first example power sharing technique, the video doorbell 202 input may be shorted for less time than it takes for the electronic chime to play its ring. Pulse means shorting the two input power wires on and off in a deliberate pattern with the power being applied to the chime while shorted and power applied to the video doorbell when not shorted. In some cases to support powering both the chime and the doorbell, there needs to be some electronics at the electronic chime that is like a bypass, or a bypass, or not a bypass that allows sufficient operating power to flow to the doorbell when not ringing the chime. The methods described in this document apply to the video doorbell. In this example, the video doorbell can ring the electronic chime indefinitely without a battery or without having to reduce the power consumption of the doorbell by shutting down some function like turning off the Wi-Fi or shutting down the video creation, etc. Thus, if desired or necessary, the doorbell can be run at its highest required power, while concurrently being able to ring an electronic chime 108 indefinitely without a battery. Several different pulsing methods that can be used for a video doorbell to ring an electronic chime.

In the second example power sharing technique between the chime and video doorbell may include pulsing, either synchronized or not synchronized. A pulse is a ratio on shorting and not shorting that will provide enough power to support full operation of the doorbell and the electronic chime playing its chime simultaneously. There may be two pulsing methods, one that is synchronized and one that is not synchronized. For non-synchronized, it is a pulsing pattern that supplies power to both the chime and the doorbell but without any knowledge of the input AC waveform timing.

A first example pulsing method can be non-synchronized to the input AC waveform and pulse in an open to short ratio that will supply sufficient power to both video doorbell 202 and chime 108, independent of any random alignment achieved with the input AC waveform. For example, 3 ms shorted (power to chime but no power to doorbell) and 15 ms not shorted (power to doorbell but not chime) repeat for as long as the Chime plays its tune. Usually, up to about 8 seconds but this powering ratio can be maintained indefinitely without either entity losing enough power to stop operation.

A second example pulsing method may include synchronizing to the input power waveform. By using a circuit that detects the input wave form's timing such as when the input AC waveform is near zero volts or near peak value, the input of the video doorbell can be shorted and synchronized to a point in time when the transformer is not supplying power to the video doorbell. In some implementations, the structure of the power system in a doorbell may allow power or current to flow into the input when the input voltage is more than the stored capacitance in C1. This may be less than the full 60 or 50 Hz input time. The AC transformer input voltage charges or adds power to the doorbell input capacitor C1 when this AC voltage applied is higher than the voltage on the capacitor.

Figure 5:
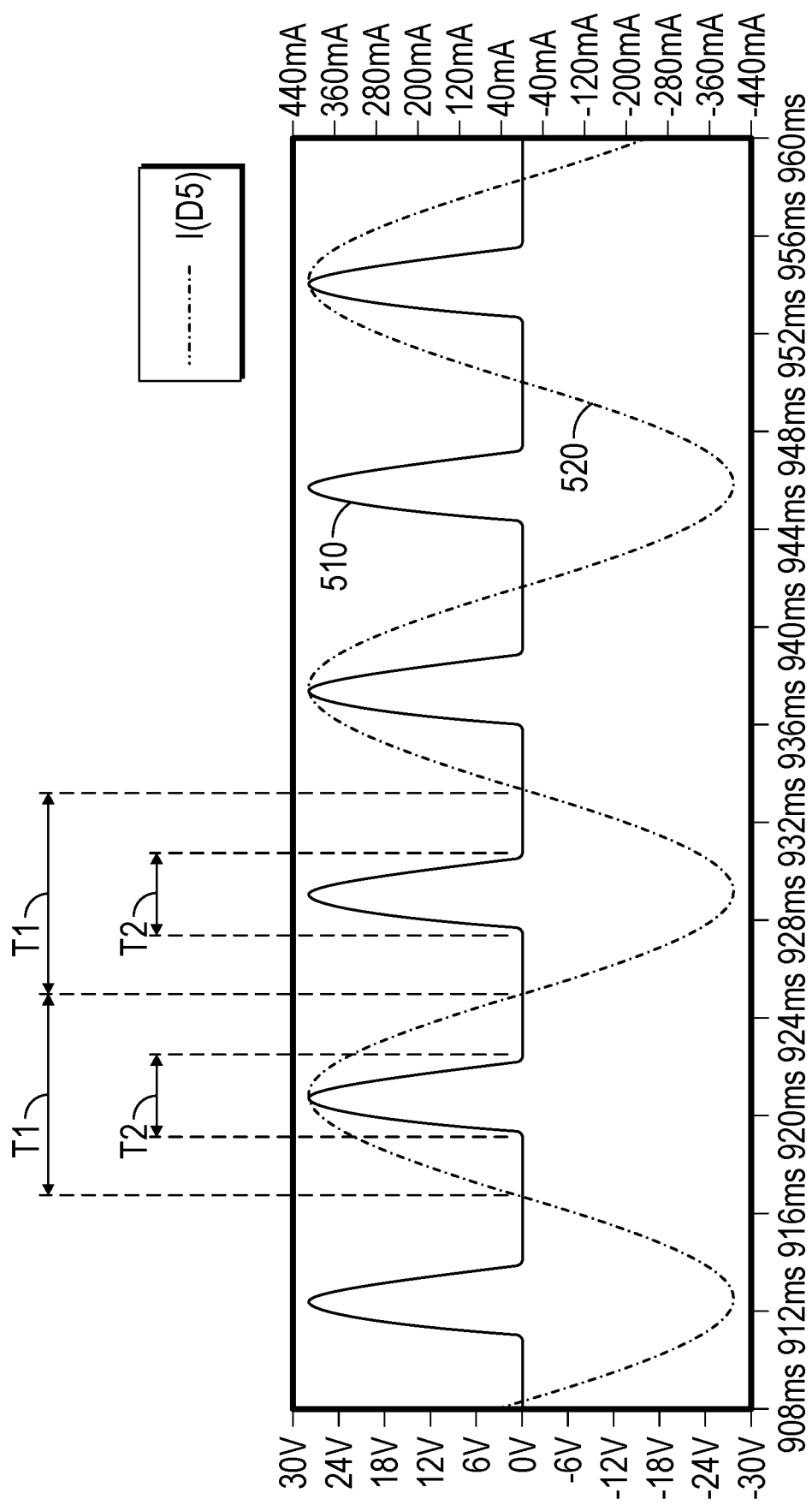
FIG. 5 illustrates voltage and current readings from an example video doorbell.

FIG. 5 illustrates voltage and current readings from an example video doorbell. In the example of FIG. 5, feature 510 is the current flowing through D1 (and D2) to charge the input capacitor C1, whereas feature 520 is the applied AC waveform. T1 is ½ of an AC input cycle of 60 or 50 Hz (8.33 ms or 10 ms respectively). T2 is the time during which current flows into C1. T1 is greater than T2. The time between T1 and T2 no power can flow to the doorbell.

Once the video doorbell detects the AC voltage around the time a synchronizing point such as when it crosses zero-volts, a timing or counting method can be used to know when to short or open the input signal at start of T2. If the input is shorted during the time that the AC voltage is near zero volts, it will not be possible to detect the state of the input AC waveform. Therefore, there are several pulsing methods to ensure that the doorbell is still synchronized. If the drift of the timing of the video doorbell versus the input AC can still be close enough to operate up to 8 seconds of ringing, nothing needs to be done in terms of resynchronizing after initial synchronization. If it is desirable to resynchronize, the input short can be removed to restart the timing.

The example of FIG. 5 also provides an example illustration that indicates the timing of a half cycle input AC voltage (trace 520). The feature/trace 510 is the current flow in the system. At start of time period T1, there is no current trace 510) flowing to the doorbell. T2 current flows to the doorbell. At the end of T2, again no current to the doorbell. By being synchronized to the waveform one example of timing would be to short the video doorbell input, which in turn powers the electronic chime during T1 except during T2 in which the short is removed so that C1 can charge. This would both power the chime while having virtually no effect on the normal operation of applying power to the doorbell input. Note that a 60 Hertz wave form is about 16.6666 etc. milliseconds long. A half cycle is 8.333 ms. The time it takes to charge T2 under normal operation can be on the order of 2-3 ms and the amount of current is inversely proportional to the voltage on the capacitor. This means that if the capacitor voltage discharged more than usual it will effectively charge quicker in order to achieve the input voltage. Therefore, the precise T2 duration time is not critical due the fact that if T2 is shortened, the input will send higher current than a longer T2 resulting in the same ability to power the video doorbell. What is important is that all the durations allow both the video doorbell and the chime to obtain sufficient power.

Figure 6:
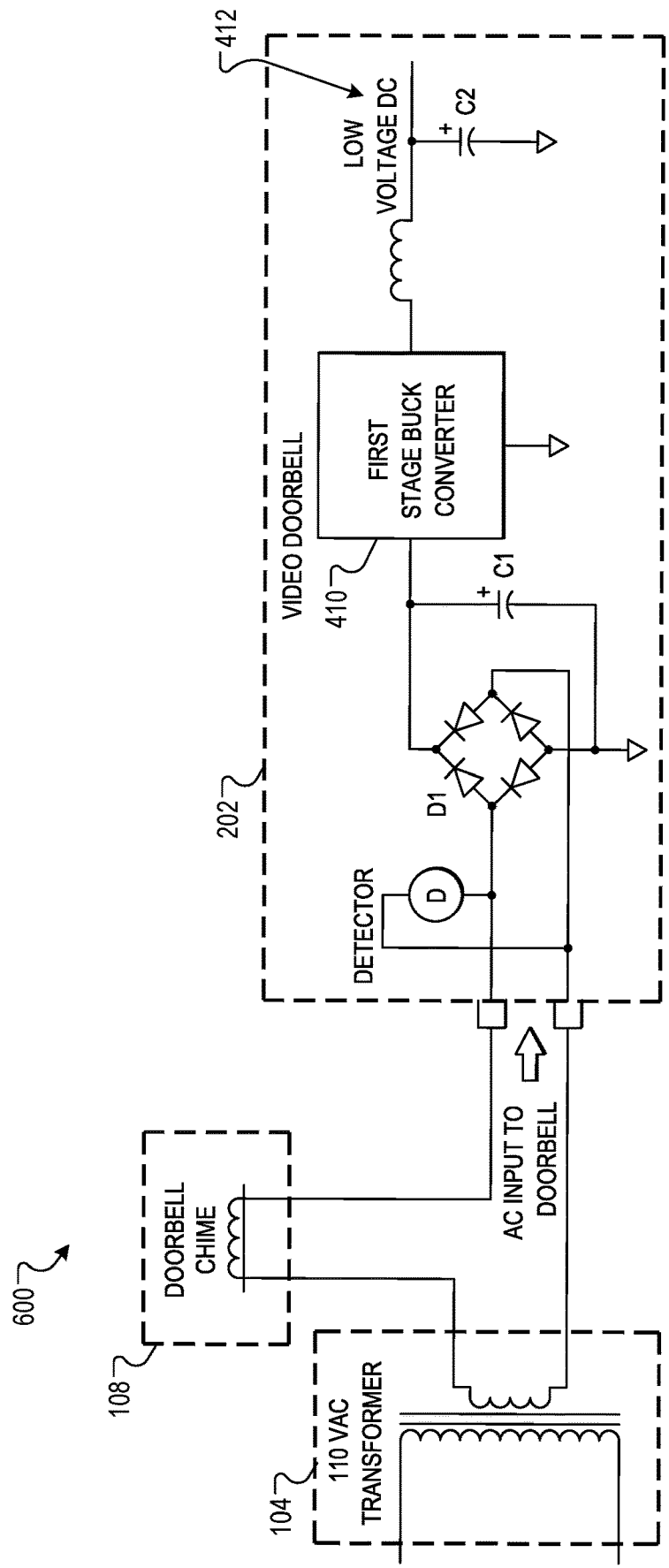
FIG. 6 illustrates an example circuit schematic of a video doorbell circuit with a detector.

In other words for FIG. 5, trace 510 is the current flowing through D1 to charge the input capacitor C1 in FIG. 6 (or D1 and D2 in FIG. 12). Trace 520 is the applied AC waveform. During T1, the input is shorted to power or external device except during T2 when it is not shorted to allow power to flow into doorbell. T1 is about half of an AC input cycle of 60 or 50 Hz (8.33 ms or 10 ms respectively). T2 is the time during which current flows into C1. T1 may be greater than T2. During time T1 and but not during T2, no power can flow to the doorbell. This repeats every half cycle.

Another synchronized pulsing method includes alternating half cycles of shorting and open. In this example, the video doorbell shorts its input at the start of T1 (half cycle) except during T2, then during the next half cycle it shorts for the full T1 and ignores T2. (See FIG. 7). This method will not be shorted so long that the input capacitor drops below the power supply's input voltage proper operating level. This also will allow the detector to sample the input AC waveform so the system can resynchronize once every AC cycle.

FIG. 6 illustrates a circuit schematic 600 of an example video doorbell circuit with a detector. The output of the detector can be attached to local circuits or output to a microcontroller input to detect and control the timing. For example, the controller can sample the AC input signal using a detector that is operable to detect the AC input signal as it is passed to a first stage of a power supply circuit of the video doorbell. The detector generates a detection signal and passes the detection signal to the microcontroller. The detection signal can indicate a change in polarity of the AC signal corresponding to when a value of the AC signal changes from 0 volts or immediately passes the zero-crossing. The detection signal can also indicate a peak value of the AC signal or a minimum value of the AC signal. The controller or circuit can synchronize a timing of the switching iterations based on a sampling of the AC for a zero crossing.

Figure 7A:
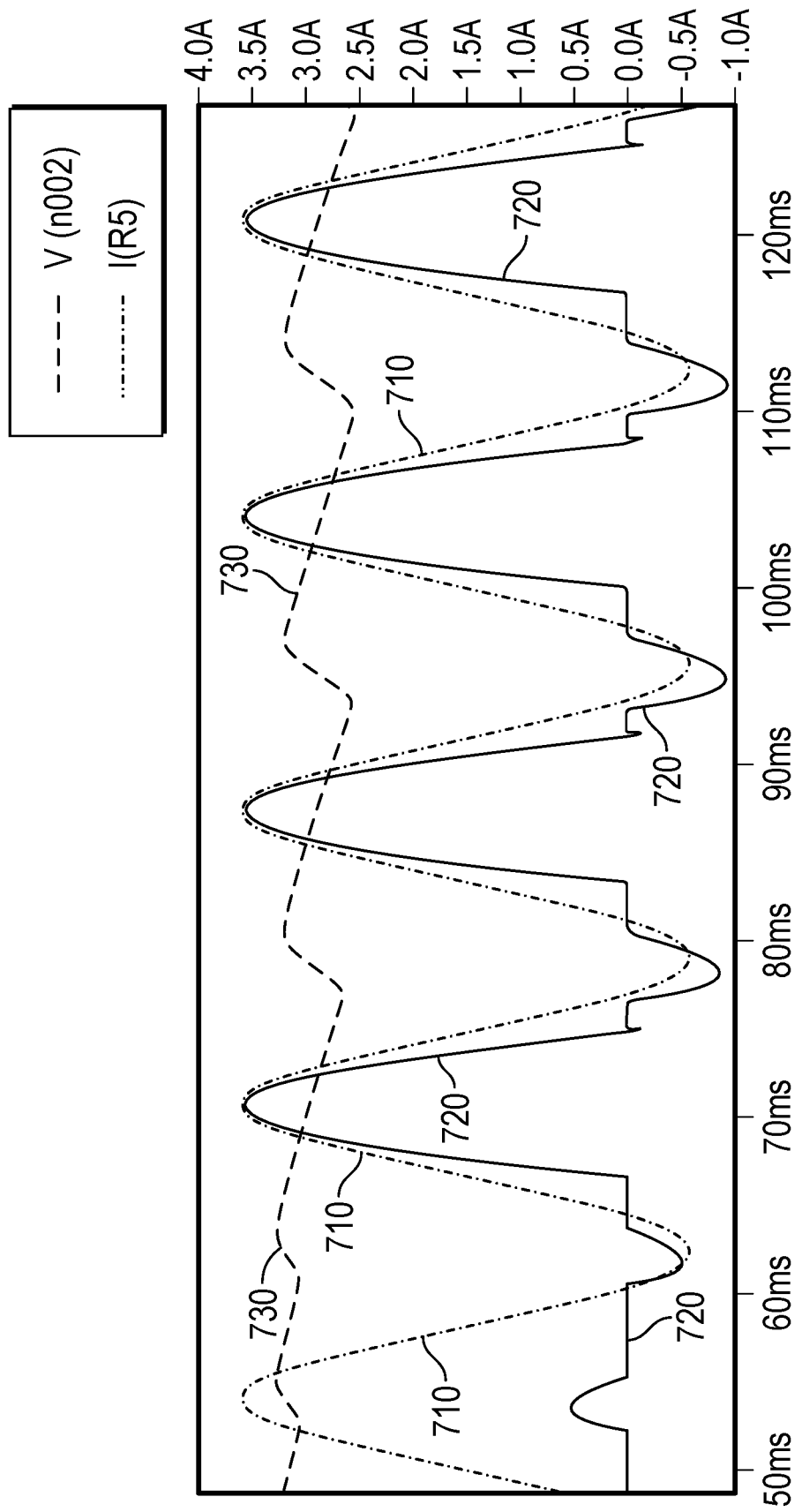
FIGS. 7A, 7B, and 8 illustrate example voltage and current readings from an example video doorbell.
Figure 7B:
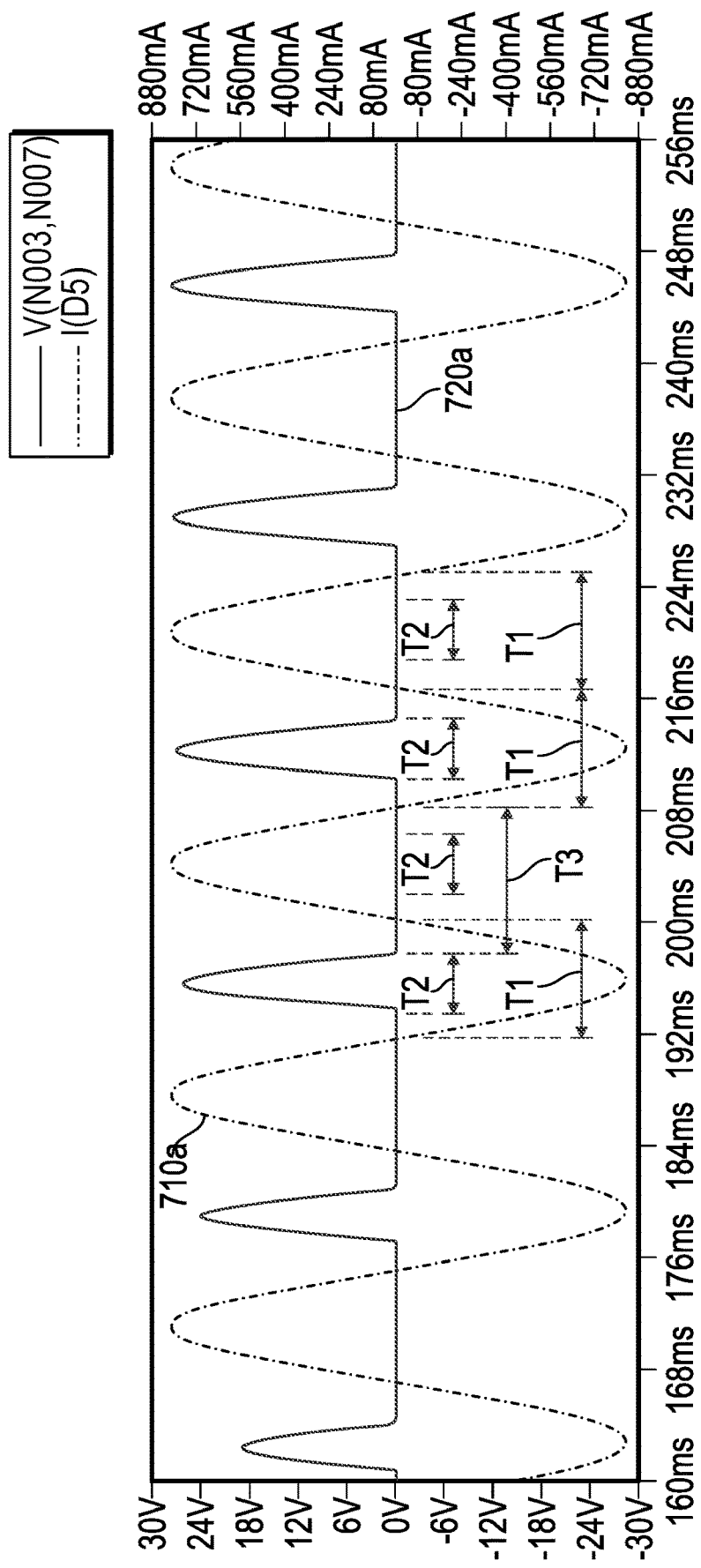
Figure 8:
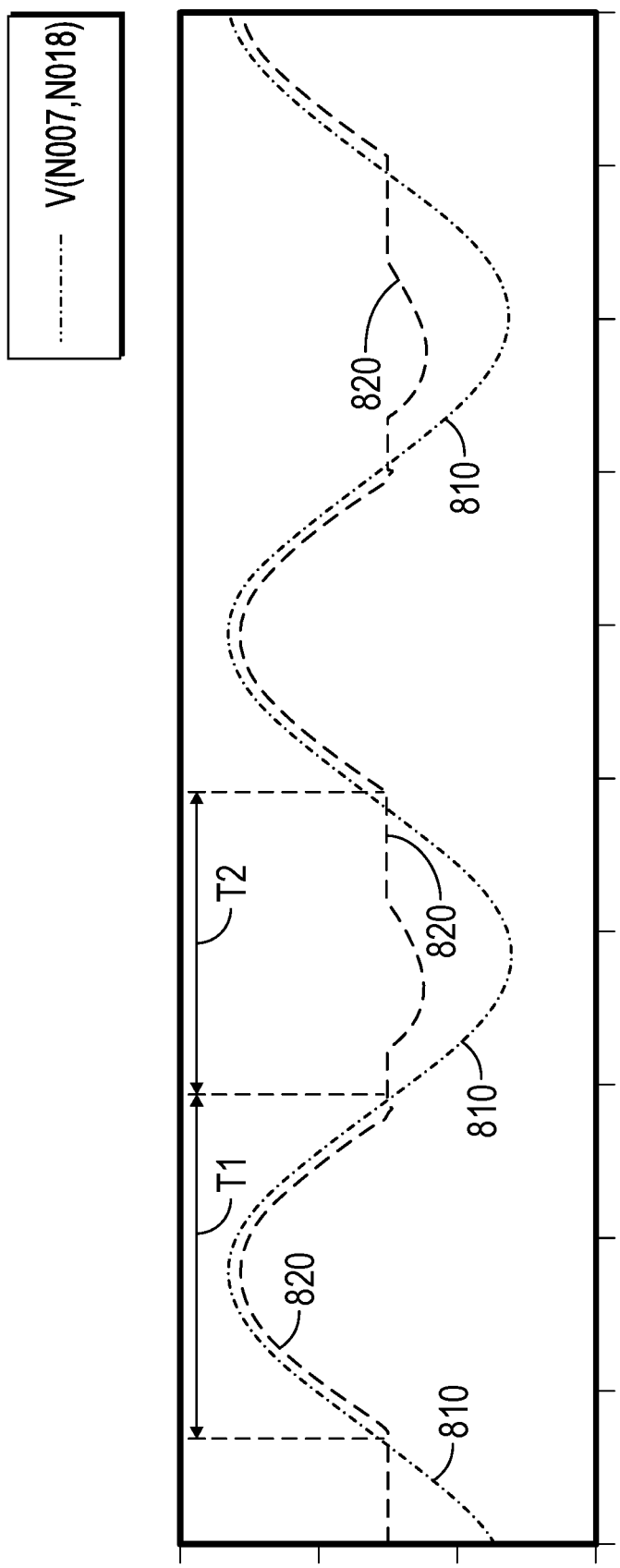

FIG. 7A illustrates voltage and current readings from an example video doorbell. FIG. 7A shows how to resychronize after initial sync. Shorting the input may make it impossible to detect input AC waveform since it is not present during shorting. The idea is to stop shorting during one of the transitions of the AC input thru 0 (zero crossing). There may be several ways to unshort long enough to detect AC input zero cross. Unshorting can occur after T2 below for any time after initial T1 up through T3 or slightly after initial T3 or end of T3. In this case, it may be necessary to have it unshorted thru one transition and then repeat the T1/T2 short unshort pattern. FIG. 8 illustrates voltage and current readings from an example video doorbell.

Figure 9:
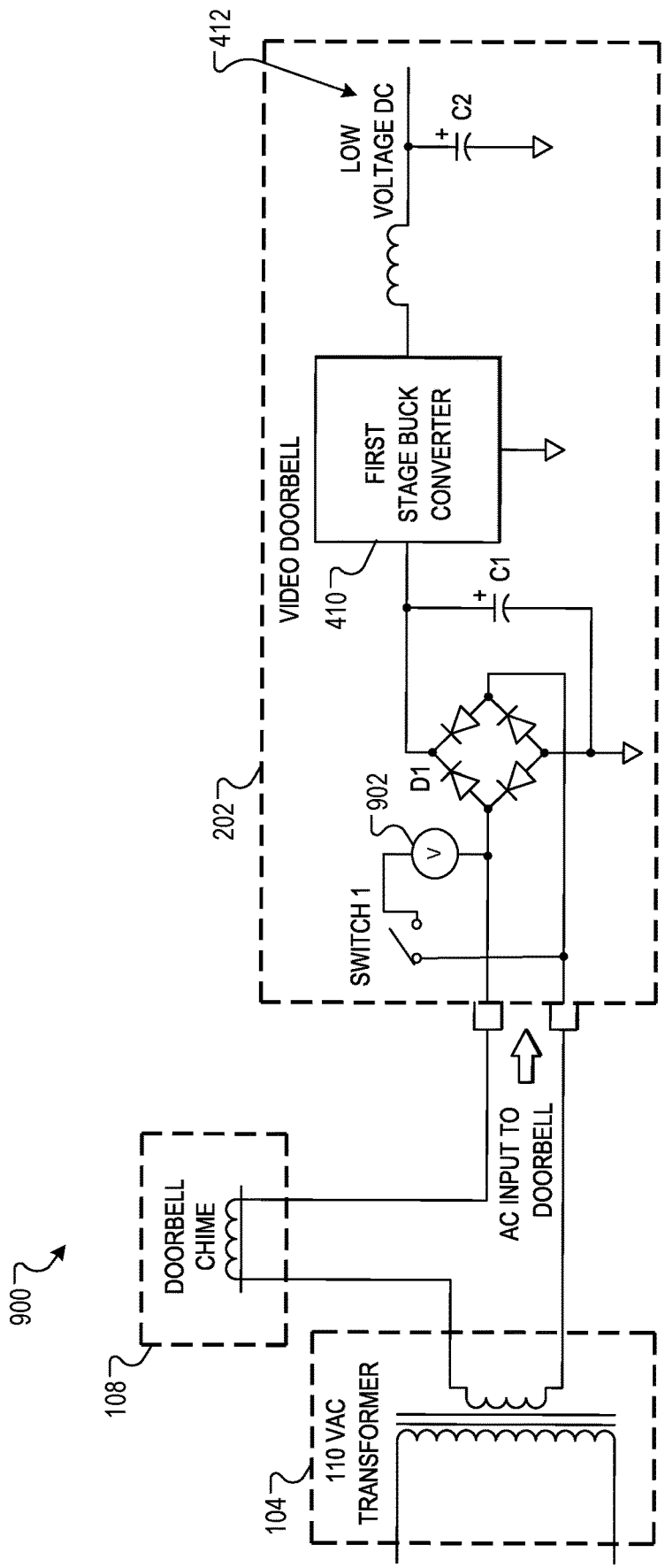
FIG. 9 is an example circuit schematic of a video doorbell that includes a switchable voltmeter across a diode.

A third pulsing method involves sending power to the doorbell 202 and the chime 108 simultaneously or concurrently. In some cases, to implement this method, a power sharing arrangement is created by additional circuitry on the video doorbell 202. Instead of a full short on the input, the circuitry causes the voltage across the doorbell input to be somewhere between 0 and the transformer voltage. This might be for example at half the transformer voltage. The example circuit schematic 900 of FIG. 9 includes a switchable voltmeter 902 across a diode for implementing this method. Most doorbells input power generation only requires its output to be 4 or 5 volts, which is below the 16 volt transformer.

One method of splitting the voltage involves adding a voltage device such as a Zener diode of about half or any ratio to the input AC transformer. For example, if AC power supply peak of a 16 volt transformer is about 30 volts peak, a 15 volt Zener diode will allow the power to be shared at around 50%. The ratio of voltage and power to the doorbell and chime could be changed by changing the Zener voltage higher or lower or you could pulse the transistor to vary the power. In some implementations, a controller of the circuit determines a ratio of voltage and power required to operate the video doorbell for a duration of the audio output by the chime. The controller can generate a control signal that is a switching pulse. The switching pulse is applied to the switch to supply the ratio of voltage and power required to operate the video doorbell.

Another method is to monitor the voltage across the DC side of D1 during the ring shorting time and adjust the load on D1 until a presubscribed voltage is reached. This may be a dynamic method instead of a fixed method. In some implementations, the system with a mechanical chime may be operated without a battery using, for example, the architecture of FIG. 4.

Figure 10:
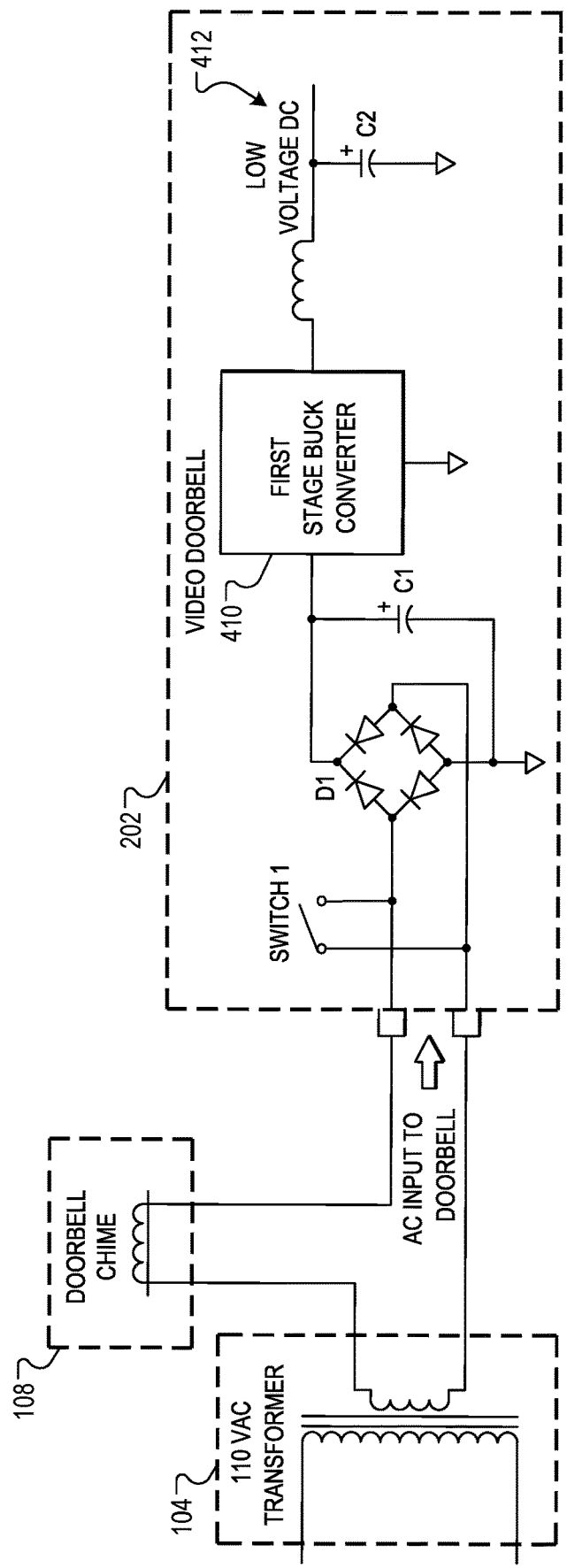
FIG. 10 is an example circuit schematic of a video doorbell.
Figure 11:
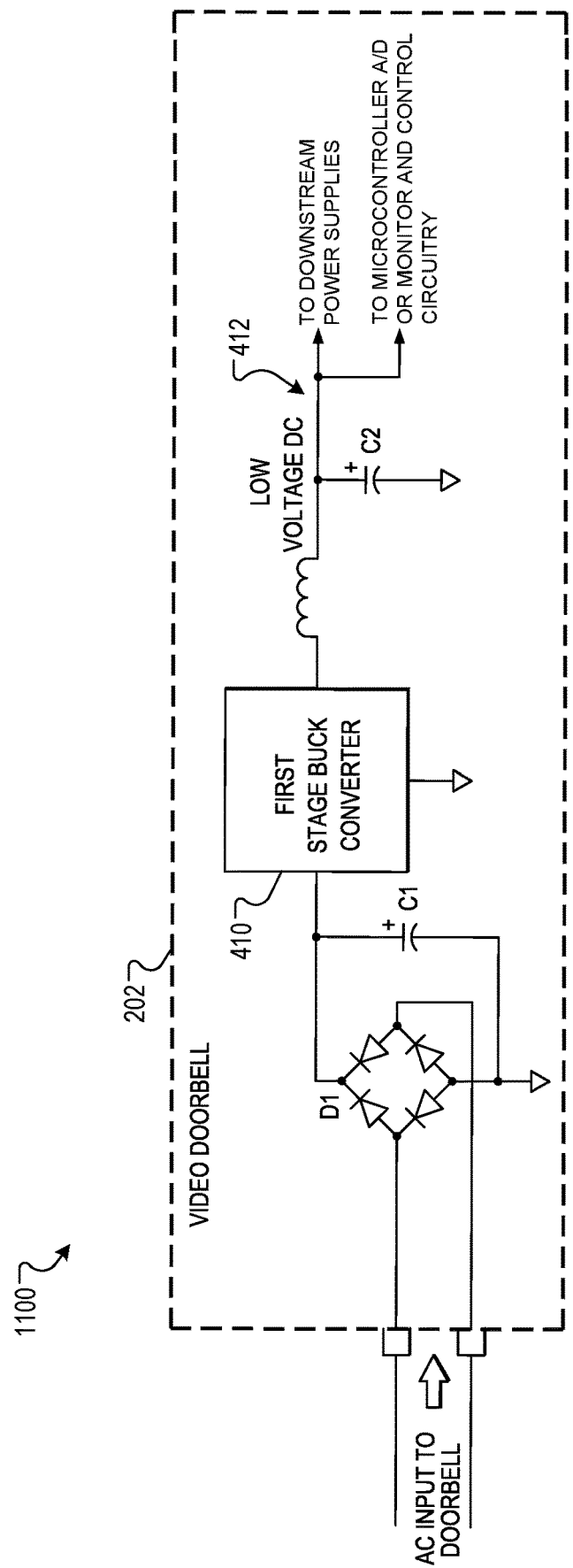
FIG. 11 is an example circuit schematic of a video doorbell that includes connections to a downstream power supply and control circuitry.

FIG. 10 is another circuit schematic of an example video doorbell. The method of iteratively shorting the input of the video doorbell may be run or executed by shorting switch 1 on the input. FIG. 11 is an example circuit schematic 1100 of a video doorbell 202 that includes connections to a downstream power supply and control circuitry. As noted above, a first stage buck converter 410 of the circuit outputs a lower voltage DC signal 412 so that downstream buck power supplies can create DC voltages (e.g., power signals) to power internal components of the video doorbell 202. As noted above, the described power sharing technique can use a timed pulse signal to control a timing of switch S1 is shorted or opened. As shown in the example of FIG. 11, the video doorbell system can include a controller (e.g., a microcontroller or microprocessor) that controls the switch to iteratively short the input. In some implementations, the system includes an analog-to-digital converter as well as monitor and control circuitry, which may include the detector described above.

There are several advantages when synchronizing the ringing circuit when a mechanical chime is used. First, if one were to open and close the Switch 1 when the AC input voltage is near zero that will cause less transients or shock to Switch 1 as no current is flowing and there is no voltage at that point in time. Similar to shorting something and seeing a spark, this may be adding a low impedance device to a high voltage. Second, the mechanical chime has a large inductor that creates a voltage proportional to the change in current. When shorting at the point in time that the AC input voltage is near zero will also cause less voltage transients in the system. The release of short even when current isn't flowing will cause the chimes inductance to create a reverse voltage. In some implementations, releasing at Vin of zero or possibly Vin of the peak may be used. In some implementations, the mechanical chime cannot be pulsed in any power sharing scheme like the electronic chime and still have it ring.

Depending on how much power a video doorbell consumes during the ringing process, C1 could be increased to cover a single ringing pulse time, especially if shortened. This has some physical limitations because C1 must withstand large input voltages and to do so C1 becomes physically large for the small space inside a video doorbell.

It would be more practical to put large low voltage capacitors (C2) or what are known as super capacitors ("supercaps") on the output of the first power stage. There are also physical limits with these capacitors since they tend to be big as compared to the interior space of a video doorbell. Use of the supercaps can require use of two capacitors in series because the respective rated voltage of each supercap is too low to use just a single supercap at this stage of the circuitry.

The issue with the supercap is that rapid repeated ringing will discharge these capacitors enough within a short period of time for the system to lose power. The rapid repeated ringing must be detected and the actual ringing of the mechanical chime adjusted such that the system won't lose all of its stored power as to stop operating. If the supercap voltage is monitored, the ringing sequence of shorting and opening the input can be adjusted such that the system will maintain its stored power.

Figure 13:
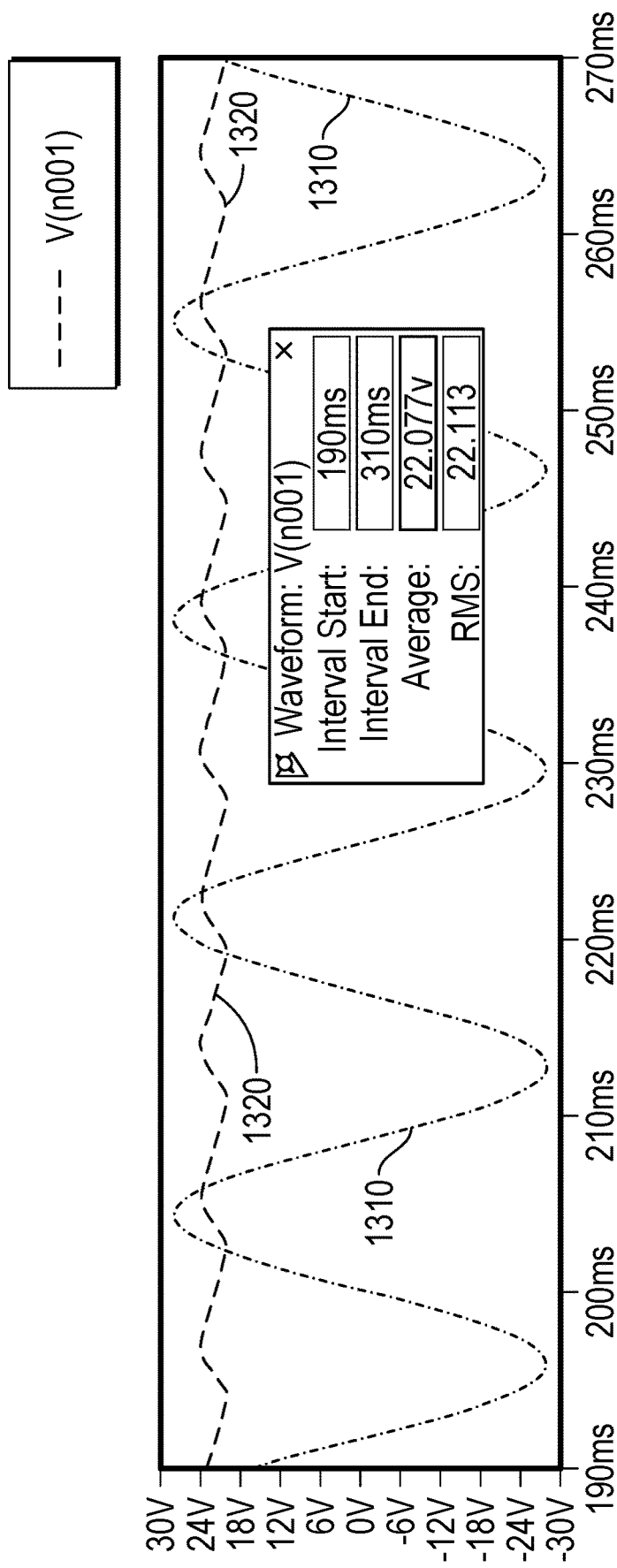
FIGS. 13-15 illustrate voltage and current readings from the example circuit in FIG. 12.

FIG. 12 is a schematic of an example video doorbell. In some implementations, the energy stored in C1 may be increased. The process of ringing the chime is to short Switch 1 in the example of FIG. 12. While Switch 1 is shorted, the doorbell still uses power from storage such as C1 since it is not supplied any power from the transformer 104. This depletes the charge on C1 and typically drains its voltage until it can no longer supply power to the doorbell. $Q=C*V$ FIG. 13 illustrates example voltage and current readings from the circuit in FIG. 12. The amount of energy or charge stored in C1 is related to the applied voltage. If the voltage is increased the amount of charge is increased proportionally. The voltage available for C1 is the rectified DC voltage of the transformer 104 after some voltage losses due to wiring resistance and D1. C1 operable to smooth out the peak voltages applied. Typically, from a 16 volt 10 VA transformer, when supplying a few watts that voltage is about 28 volts peak or 21 volts RMS. The DC voltage on C1 on average is 21-24 volts typically and is shown in trace 1320.

The pulse duration to ring the mechanical chime electronically in a doorbell can be arbitrary and is subject to the preferences of the designer. In some implementations, the pulse duration emulates a person pressing on the mechanical switch. For example, the pulse duration can be around 250 ms. If the pulse duration is optimized for loudness, it can be around 80 ms to 100 ms. Some video doorbells, and it depends on the power consumed by each doorbell, cannot sustain a time of more than about 50 ms of shorting its input before C1 is completely discharged past its ability to supply power. If the voltage on C1 was increased, the amount of charge Q and the amount of time C1 can supply power is linearly related. The only voltage available is the transformer. By relying on C1 for power, this lowers any requirement for power storage in the stage after the First Stage Buck Converter. This can help eliminate the need for a battery to supply energy during the chime ringing via Switch 1.

Figure 14:
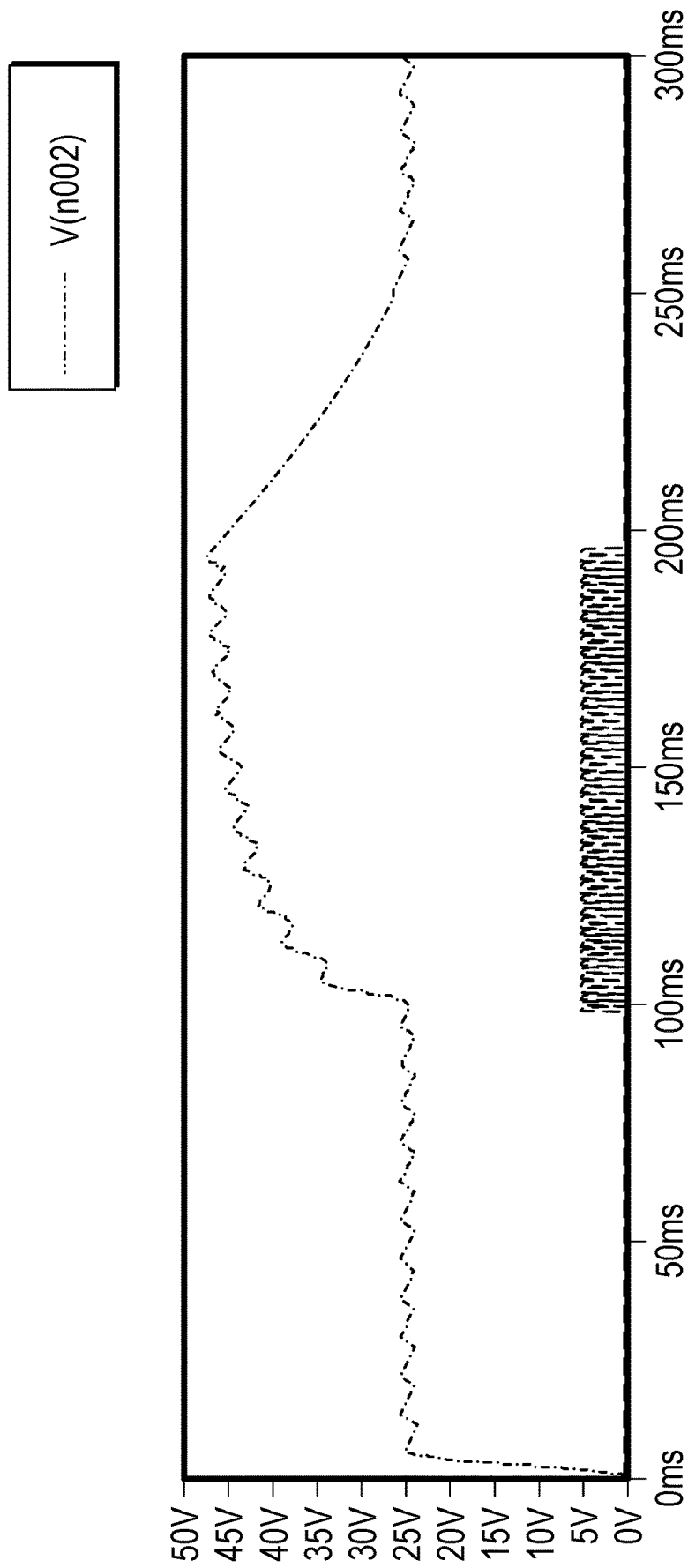
Figure 15:
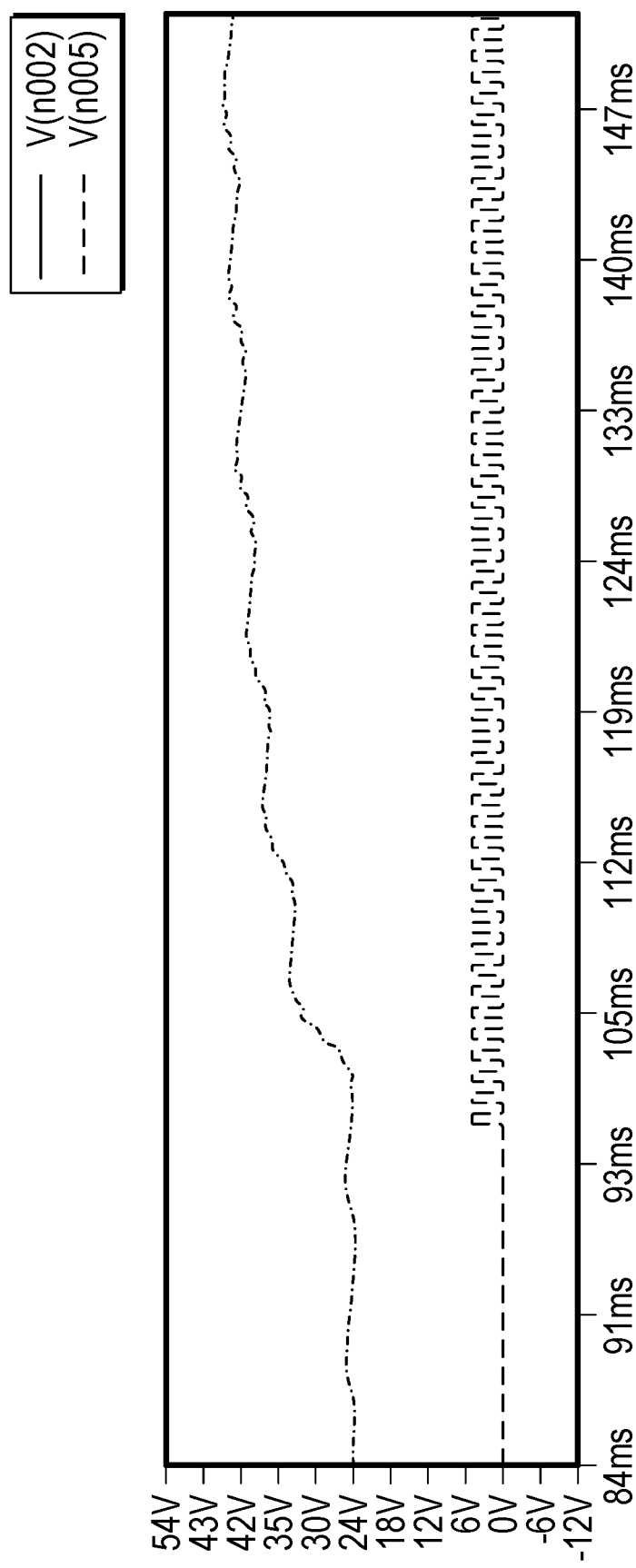

A method of increasing the voltage and thus the charge on C1 is for Switch 1 to open and close at a frequency that allows the inductance of the chime to create additional voltage by way of operating as a switching boost converter. This requires D2 to be added to the circuit and possibly D3 for overvoltage protection of input switching converter since this voltage can reach a very high voltage. The voltage it reaches is related to the length of time it is pulsed. It can for example product voltage at a 300 volt per second rate. Note that D2 is there in any case because when the input is shorted, discharging C1 may not be desirable. The voltage can be brought up to higher voltage within a few milliseconds just prior to ringing or shorting Switch 1 (see FIGS. 14 and 15). FIGS. 14 and 15 illustrate voltage and current readings from the circuit in FIG. 12.

Figure 16:
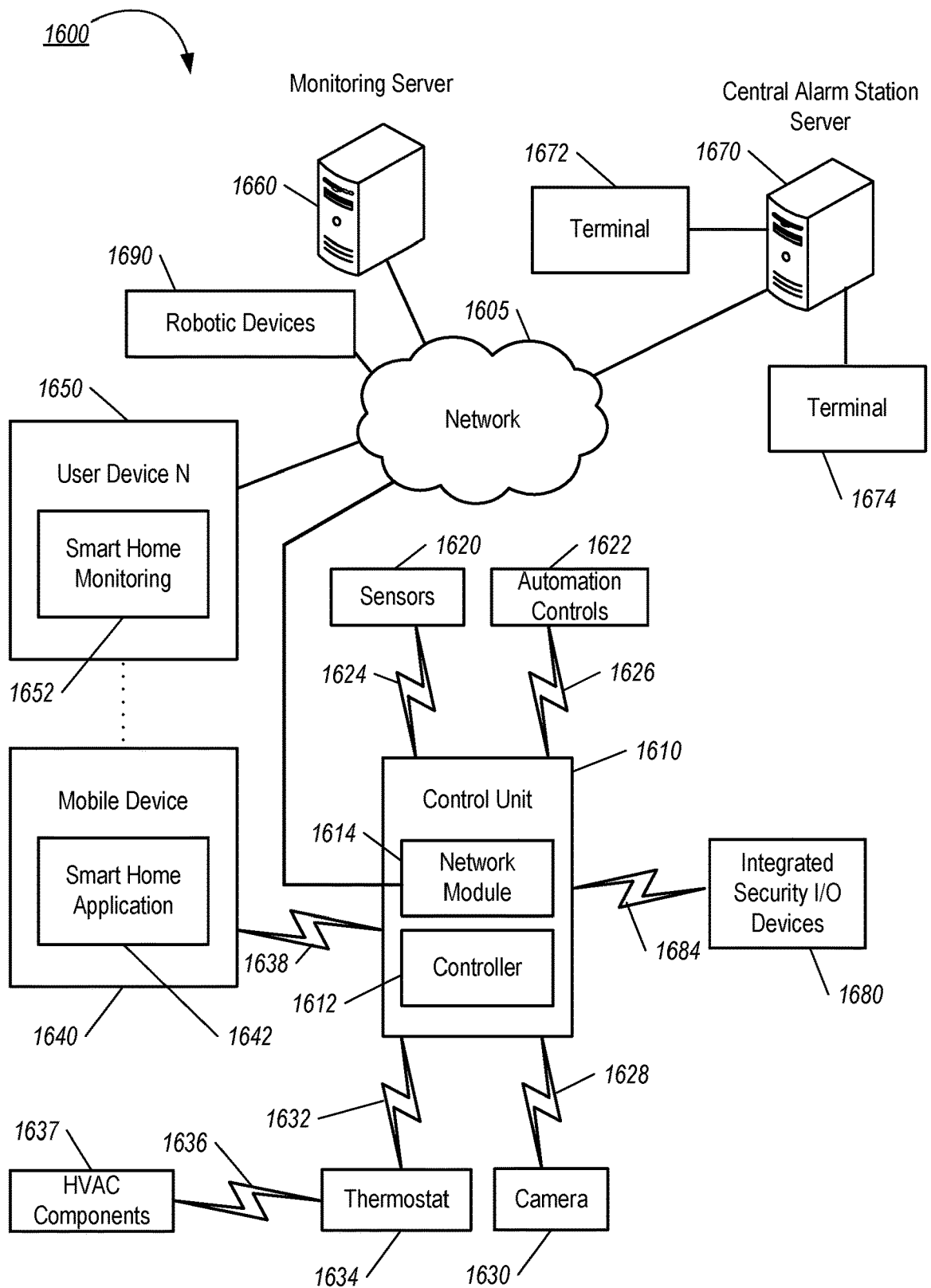
FIG. 16 is a block diagram illustrating an example security monitoring system.

FIG. 16 is a diagram illustrating an example of a home monitoring system 1600. The monitoring system 1600 includes a network 1605, a control unit 1610, one or more user devices 1640 and 1650, a monitoring server 1660, and a central alarm station server 1670. In some examples, the network 1605 facilitates communications between the control unit 1610, the one or more user devices 1640 and 1650, the monitoring server 1660, and the central alarm station server 1670.

The network 1605 is configured to enable exchange of electronic communications between devices connected to the network 1605. For example, the network 1605 may be configured to enable exchange of electronic communications between the control unit 1610, the one or more user devices 1640 and 1650, the monitoring server 1660, and the central alarm station server 1670. The network 1605 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 1605 may include multiple networks or subnetworks, each of which may include, for example, a wired or wireless data pathway. The network 1605 may include a circuit-switched network, a packet-switched data network, or any other network able to carry electronic communications (e.g., data or voice communications). For example, the network 1605 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 1605 may include one or more networks that include wireless data channels and wireless voice channels. The network 1605 may be a wireless network, a broadband network, or a combination of networks including a wireless network and a broadband network.

The control unit 1610 includes a controller 1612 and a network module 1614. The controller 1612 is configured to control a control unit monitoring system (e.g., a control unit system) that includes the control unit 1610. In some examples, the controller 1612 may include a processor or other control circuitry configured to execute instructions of a program that controls operation of a control unit system. In these examples, the controller 1612 may be configured to receive input from sensors, flow meters, or other devices included in the control unit system and control operations of devices included in the household (e.g., speakers, lights, doors, etc.). For example, the controller 1612 may be configured to control operation of the network module 1614 included in the control unit 1610.

The network module 1614 is a communication device configured to exchange communications over the network 1605. The network module 1614 may be a wireless communication module configured to exchange wireless communications over the network 1605. For example, the network module 1614 may be a wireless communication device configured to exchange communications over a wireless data channel and a wireless voice channel. In this example, the network module 1614 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, 5G CDMA, EDGE or EGPRS, EV-DO or EVDO, UMTS, or IP.

The network module 1614 also may be a wired communication module configured to exchange communications over the network 1605 using a wired connection. For instance, the network module 1614 may be a modem, a network interface card, or another type of network interface device. The network module 1614 may be an Ethernet network card configured to enable the control unit 1610 to communicate over a local area network and/or the Internet. The network module 1614 also may be a voice band modem configured to enable the alarm panel to communicate over the telephone lines of Plain Old Telephone Systems (POTS).

The control unit system that includes the control unit 1610 includes one or more sensors. For example, the monitoring system may include multiple sensors 1620. The sensors 1620 may include a lock sensor, a contact sensor, a motion sensor, or any other type of sensor included in a control unit system. The sensors 1620 also may include an environmental sensor, such as a temperature sensor, a water sensor, a rain sensor, a wind sensor, a light sensor, a smoke detector, a carbon monoxide detector, an air quality sensor, etc. The sensors 1620 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 1620 can also include a radio-frequency identification (RFID) sensor that identifies a particular article that includes a pre-assigned RFID tag.

The control unit 1610 communicates with the home automation controls 1622 and a camera 1630 to perform monitoring. The home automation controls 1622 are connected to one or more devices that enable automation of actions in the home. For instance, the home automation controls 1622 may be connected to one or more lighting systems and may be configured to control operation of the one or more lighting systems. In addition, the home automation controls 1622 may be connected to one or more electronic locks at the home and may be configured to control operation of the one or more electronic locks (e.g., control Z-Wave locks using wireless communications in the Z-Wave protocol). Further, the home automation controls 1622 may be connected to one or more appliances at the home and may be configured to control operation of the one or more appliances. The home automation controls 1622 may include multiple modules that are each specific to the type of device being controlled in an automated manner. The home automation controls 1622 may control the one or more devices based on commands received from the control unit 1610. For instance, the home automation controls 1622 may cause a lighting system to illuminate an area to provide a better image of the area when captured by a camera 1630.

The camera 1630 may be a video/photographic camera or other type of optical sensing device configured to capture images. For instance, the camera 1630 may be configured to capture images of an area within a building or home monitored by the control unit 1610. The camera 1630 may be configured to capture single, static images of the area and also video images of the area in which multiple images of the area are captured at a relatively high frequency (e.g., thirty images per second). The camera 1630 may be controlled based on commands received from the control unit 1610.

The camera 1630 may be triggered by several different types of techniques. For instance, a Passive Infra-Red (PIR) motion sensor may be built into the camera 1630 and used to trigger the camera 1630 to capture one or more images when motion is detected. The camera 1630 also may include a microwave motion sensor built into the camera and used to trigger the camera 1630 to capture one or more images when motion is detected. The camera 1630 may have a "normally open" or "normally closed" digital input that can trigger capture of one or more images when external sensors (e.g., the sensors 1620, PIR, door/window, etc.) detect motion or other events. In some implementations, the camera 1630 receives a command to capture an image when external devices detect motion or another potential alarm event. The camera 1630 may receive the command from the controller 1612 or directly from one of the sensors 1620.

In some examples, the camera 1630 triggers integrated or external illuminators (e.g., Infra-Red, Z-wave controlled "white" lights, lights controlled by the home automation controls 1622, etc.) to improve image quality when the scene is dark. An integrated or separate light sensor may be used to determine if illumination is desired and may result in increased image quality.

The camera 1630 may be programmed with any combination of time/day schedules, system "arming state", or other variables to determine whether images should be captured or not when triggers occur. The camera 1630 may enter a low-power mode when not capturing images. In this case, the camera 1630 may wake periodically to check for inbound messages from the controller 1612. The camera 1630 may be powered by internal, replaceable batteries if located remotely from the control unit 1610. The camera 1630 may employ a small solar cell to recharge the battery when light is available. Alternatively, the camera 1630 may be powered by the controller's 1612 power supply if the camera 1630 is co-located with the controller 1612.

In some implementations, the camera 1630 communicates directly with the monitoring server 1660 over the Internet. In these implementations, image data captured by the camera 1630 does not pass through the control unit 1610 and the camera 1630 receives commands related to operation from the monitoring server 1660.

The system 1600 may also include a thermostat 1634 to perform dynamic environmental control at the home. The thermostat 1634 is configured to monitor temperature and/or energy consumption of an HVAC system associated with the thermostat 1634, and is further configured to provide control of environmental (e.g., temperature) settings. In some implementations, the thermostat 1634 can additionally or alternatively receive data relating to activity at a home and/or environmental data at a home, e.g., at various locations indoors and outdoors at the home. The thermostat 1634 can directly measure energy consumption of the HVAC system associated with the thermostat, or can estimate energy consumption of the HVAC system associated with the thermostat 1634, for example, based on detected usage of one or more components of the HVAC system associated with the thermostat 1634. The thermostat 1634 can communicate temperature and/or energy monitoring information to or from the control unit 1610 and can control the environmental (e.g., temperature) settings based on commands received from the control unit 1610.

In some implementations, the thermostat 1634 is a dynamically programmable thermostat and can be integrated with the control unit 1610. For example, the dynamically programmable thermostat 1634 can include the control unit 1610, e.g., as an internal component to the dynamically programmable thermostat 1634. In addition, the control unit 1610 can be a gateway device that communicates with the dynamically programmable thermostat 1634. In some implementations, the thermostat 1634 is controlled via one or more home automation controls 1622.

A module 1637 is connected to one or more components of an HVAC system associated with a home, and is configured to control operation of the one or more components of the HVAC system. In some implementations, the module 1637 is also configured to monitor energy consumption of the HVAC system components, for example, by directly measuring the energy consumption of the HVAC system components or by estimating the energy usage of the one or more HVAC system components based on detecting usage of components of the HVAC system. The module 1637 can communicate energy monitoring information and the state of the HVAC system components to the thermostat 1634 and can control the one or more components of the HVAC system based on commands received from the thermostat 1634.

In some examples, the system 1600 further includes one or more robotic devices 1690. The robotic devices 1690 may be any type of robots that are capable of moving and taking actions that assist in home monitoring. For example, the robotic devices 1690 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 1690 may be devices that are intended for other purposes and merely associated with the system 1600 for use in appropriate circumstances. For instance, a robotic vacuum cleaner device may be associated with the monitoring system 1600 as one of the robotic devices 1690 and may be controlled to take action responsive to monitoring system events.

In some examples, the robotic devices 1690 automatically navigate within a home or outside a home. In these examples, the robotic devices 1690 include sensors and control processors that guide movement of the robotic devices 1690 within the home or outside the home. For instance, the robotic devices 1690 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 1690 may include control processors that process output from the various sensors and control the robotic devices 1690 to move along a path that reaches the desired destination and avoids obstacles. In this regard, the control processors detect walls or other obstacles in the home or outside the home and guide movement of the robotic devices 1690 in a manner that avoids the walls, trees, fences, and other obstacles.

In addition, the robotic devices 1690 may store data that describes attributes of the home and the area outside the home. For instance, the robotic devices 1690 may store a floorplan, a property map, and/or a three-dimensional model of the home that enables the robotic devices 1690 to navigate the home. During initial configuration, the robotic devices 1690 may receive the data describing attributes of the home, determine a frame of reference to the data (e.g., a home or reference location in the home), and navigate the home based on the frame of reference and the data describing attributes of the home. Further, initial configuration of the robotic devices 1690 also may include learning of one or more navigation patterns in which a user provides input to control the robotic devices 1690 to perform a specific navigation action (e.g., fly to an upstairs bedroom and spin around while capturing video and then return to a home charging base). In this regard, the robotic devices 1690 may learn and store the navigation patterns such that the robotic devices 1690 may automatically repeat the specific navigation actions upon a later request.

In some examples, the robotic devices 1690 may include data capture and recording devices. In these examples, the robotic devices 1690 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 1690 to take and store a biometric sample that can be used to identify the person (e.g., a biometric sample with DNA that can be used for DNA testing).

In some implementations, the robotic devices 1690 may include output devices. In these implementations, the robotic devices 1690 may include one or more displays, one or more speakers, and/or any type of output devices that allow the robotic devices 1690 to communicate information to a nearby user.

The robotic devices 1690 also may include a communication module that enables the robotic devices 1690 to communicate with the control unit 1610, each other, and/or other devices. The communication module may be a wireless communication module that allows the robotic devices 1690 to communicate wirelessly. For instance, the communication module may be a Wi-Fi module that enables the robotic devices 1690 to communicate over a local wireless network at the home. The communication module further may be a 900 MHz wireless communication module that enables the robotic devices 1690 to communicate directly with the control unit 1610. Other types of short-range wireless communication protocols, such as Bluetooth, Bluetooth LE, Z-wave, Zigbee, etc., may be used to allow the robotic devices 1690 to communicate with other devices in the home. In some implementations, the robotic devices 1690 may communicate with each other or with other devices of the system 1600 through the network 1605.

The robotic devices 1690 further may include processor and storage capabilities. The robotic devices 1690 may include any suitable processing devices that enable the robotic devices 1690 to operate applications and perform the actions described throughout this disclosure. In addition, the robotic devices 1690 may include solid-state electronic storage that enables the robotic devices 1690 to store applications, configuration data, collected sensor data, and/or any other type of information available to the robotic devices 1690.

The robotic devices 1690 are associated with one or more charging stations. The charging stations may be located at predefined home base or reference locations in the home. The robotic devices 1690 may be configured to navigate to the charging stations after completion of tasks needed to be performed for the monitoring system 1600. For instance, after completion of a monitoring operation or upon instruction by the control unit 1610, the robotic devices 1690 may be configured to automatically fly to and land on one of the charging stations. In this regard, the robotic devices 1690 may automatically maintain a fully charged battery in a state in which the robotic devices 1690 are ready for use by the monitoring system 1600.

The charging stations may be contact based charging stations and/or wireless charging stations. For contact based charging stations, the robotic devices 1690 may have readily accessible points of contact that the robotic devices 1690 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 1690 may charge through a wireless exchange of power. In these cases, the robotic devices 1690 need only locate themselves closely enough to the wireless charging stations for the wireless exchange of power to occur. In this regard, the positioning needed to land at a predefined home base or reference location in the home may be less precise than with a contact based charging station. Based on the robotic devices 1690 landing at a wireless charging station, the wireless charging station outputs a wireless signal that the robotic devices 1690 receive and convert to a power signal that charges a battery maintained on the robotic devices 1690.

In some implementations, each of the robotic devices 1690 has a corresponding and assigned charging station such that the number of robotic devices 1690 equals the number of charging stations. In these implementations, the robotic devices 1690 always navigate to the specific charging station assigned to that robotic device. For instance, a first robotic device may always use a first charging station and a second robotic device may always use a second charging station.

In some examples, the robotic devices 1690 may share charging stations. For instance, the robotic devices 1690 may use one or more community charging stations that are capable of charging multiple robotic devices 1690. The community charging station may be configured to charge multiple robotic devices 1690 in parallel. The community charging station may be configured to charge multiple robotic devices 1690 in serial such that the multiple robotic devices 1690 take turns charging and, when fully charged, return to a predefined home base or reference location in the home that is not associated with a charger. The number of community charging stations may be less than the number of robotic devices 1690.

In addition, the charging stations may not be assigned to specific robotic devices 1690 and may be capable of charging any of the robotic devices 1690. In this regard, the robotic devices 1690 may use any suitable, unoccupied charging station when not in use. For instance, when one of the robotic devices 1690 has completed an operation or is in need of battery charge, the control unit 1610 references a stored table of the occupancy status of each charging station and instructs the robotic device to navigate to the nearest charging station that is unoccupied.

The system 1600 further includes one or more integrated security devices 1680. The one or more integrated security devices may include any type of device used to provide alerts based on received sensor data. For instance, the one or more control units 1610 may provide one or more alerts to the one or more integrated security input/output devices 1680. Additionally, the one or more control units 1610 may receive one or more sensor data from the sensors 1620 and determine whether to provide an alert to the one or more integrated security input/output devices 1680.

The sensors 1620, the home automation controls 1622, the camera 1630, the thermostat 1634, and the integrated security devices 1680 may communicate with the controller 1612 over communication links 1624, 1626, 1628, 1632, 1638, and 1684. The communication links 1624, 1626, 1628, 1632, 1638, and 1684 may be a wired or wireless data pathway configured to transmit signals from the sensors 1620, the home automation controls 1622, the camera 1630, the thermostat 1634, and the integrated security devices 1680 to the controller 1612. The sensors 1620, the home automation controls 1622, the camera 1630, the thermostat 1634, and the integrated security devices 1680 may continuously transmit sensed values to the controller 1612, periodically transmit sensed values to the controller 1612, or transmit sensed values to the controller 1612 in response to a change in a sensed value.

The communication links 1624, 1626, 1628, 1632, 1638, and 1684 may include a local network. The sensors 1620, the home automation controls 1622, the camera 1630, the thermostat 1634, and the integrated security devices 1680, and the controller 1612 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 16 (CAT5) or Category 6 (CAT6) wired Ethernet network. The local network may be a mesh network constructed based on the devices connected to the mesh network.

The monitoring server 1660 is an electronic device configured to provide monitoring services by exchanging electronic communications with the control unit 1610, the one or more user devices 1640 and 1650, and the central alarm station server 1670 over the network 1605. For example, the monitoring server 1660 may be configured to monitor events generated by the control unit 1610. In this example, the monitoring server 1660 may exchange electronic communications with the network module 1614 included in the control unit 1610 to receive information regarding events detected by the control unit 1610. The monitoring server 1660 also may receive information regarding events from the one or more user devices 1640 and 1650.

In some examples, the monitoring server 1660 may route alert data received from the network module 1614 or the one or more user devices 1640 and 1650 to the central alarm station server 1670. For example, the monitoring server 1660 may transmit the alert data to the central alarm station server 1670 over the network 1605.

The monitoring server 1660 may store sensor and image data received from the monitoring system and perform analysis of sensor and image data received from the monitoring system. Based on the analysis, the monitoring server 1660 may communicate with and control aspects of the control unit 1610 or the one or more user devices 1640 and 1650.

The monitoring server 1660 may provide various monitoring services to the system 1600. For example, the monitoring server 1660 may analyze the sensor, image, and other data to determine an activity pattern of a resident of the home monitored by the system 1600. In some implementations, the monitoring server 1660 may analyze the data for alarm conditions or may determine and perform actions at the home by issuing commands to one or more of the controls 1622, possibly through the control unit 1610.

The monitoring server 1660 can be configured to provide information (e.g., activity patterns) related to one or more residents of the home monitored by the system 1600 (e.g., user 108). For example, one or more of the sensors 1620, the home automation controls 1622, the camera 1630, the thermostat 1634, and the integrated security devices 1680 can collect data related to a resident including location information (e.g., if the resident is home or is not home) and provide location information to the thermostat 1634.

The central alarm station server 1670 is an electronic device configured to provide alarm monitoring service by exchanging communications with the control unit 1610, the one or more user devices 1640 and 1650, and the monitoring server 1660 over the network 1605. For example, the central alarm station server 1670 may be configured to monitor alerting events generated by the control unit 1610. In this example, the central alarm station server 1670 may exchange communications with the network module 1614 included in the control unit 1610 to receive information regarding alerting events detected by the control unit 1610. The central alarm station server 1670 also may receive information regarding alerting events from the one or more user devices 1640 and 1650 and/or the monitoring server 1660.

The central alarm station server 1670 is connected to multiple terminals 1672 and 1674. The terminals 1672 and 1674 may be used by operators to process alerting events. For example, the central alarm station server 1670 may route alerting data to the terminals 1672 and 1674 to enable an operator to process the alerting data. The terminals 1672 and 1674 may include general-purpose computers (e.g., desktop personal computers, workstations, or laptop computers) that are configured to receive alerting data from a server in the central alarm station server 1670 and render a display of information based on the alerting data. For instance, the controller 1612 may control the network module 1614 to transmit, to the central alarm station server 1670, alerting data indicating that a sensor 1620 detected motion from a motion sensor via the sensors 1620. The central alarm station server 1670 may receive the alerting data and route the alerting data to the terminal 1672 for processing by an operator associated with the terminal 1672. The terminal 1672 may render a display to the operator that includes information associated with the alerting event (e.g., the lock sensor data, the motion sensor data, the contact sensor data, etc.) and the operator may handle the alerting event based on the displayed information.

In some implementations, the terminals 1672 and 1674 may be mobile devices or devices designed for a specific function. Although FIG. 16 illustrates two terminals for brevity, actual implementations may include more (and, perhaps, many more) terminals.

The one or more authorized user devices 1640 and 1650 are devices that host and display user interfaces. For instance, the user device 1640 is a mobile device that hosts or runs one or more native applications (e.g., the home monitoring application 1642). The user device 1640 may be a cellular phone or a non-cellular locally networked device with a display. The user device 1640 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 1640 may perform functions unrelated to the monitoring system, such as placing personal telephone calls, playing music, playing video, displaying pictures, browsing the Internet, maintaining an electronic calendar, etc.

The user device 1640 includes a home monitoring application 1652. The home monitoring application 1642 refers to a software/firmware program running on the corresponding mobile device that enables the user interface and features described throughout. The user device 1640 may load or install the home monitoring application 1642 based on data received over a network or data received from local media. The home monitoring application 1642 runs on mobile devices platforms, such as iPhone, iPod touch, Blackberry, Google Android, Windows Mobile, etc. The home monitoring application 1642 enables the user device 1640 to receive and process image and sensor data from the monitoring system.

The user device 1640 may be a general-purpose computer (e.g., a desktop personal computer, a workstation, or a laptop computer) that is configured to communicate with the monitoring server 1660 and/or the control unit 1610 over the network 1605. The user device 1640 may be configured to display a smart home user interface 1652 that is generated by the user device 1640 or generated by the monitoring server 1660. For example, the user device 1640 may be configured to display a user interface (e.g., a web page) provided by the monitoring server 1660 that enables a user to perceive images captured by the camera 1630 and/or reports related to the monitoring system. Although FIG. 16 illustrates two user devices for brevity, actual implementations may include more (and, perhaps, many more) or fewer user devices.

In some implementations, the one or more user devices 1640 and 1650 communicate with and receive monitoring system data from the control unit 1610 using the communication link 1638. For instance, the one or more user devices 1640 and 1650 may communicate with the control unit 1610 using various local wireless protocols such as Wi-Fi, Bluetooth, Z-wave, Zigbee, MoCA, HomePlug (ethernet over power line), or wired protocols such as Ethernet and USB, to connect the one or more user devices 1640 and 1650 to local security and automation equipment. The one or more user devices 1640 and 1650 may connect locally to the monitoring system and its sensors and other devices. The local connection may improve the speed of status and control communications because communicating through the network 1605 with a remote server (e.g., the monitoring server 1660) may be significantly slower.

Although the one or more user devices 1640 and 1650 are shown as communicating with the control unit 1610, the one or more user devices 1640 and 1650 may communicate directly with the sensors and other devices controlled by the control unit 1610. In some implementations, the one or more user devices 1640 and 1650 replace the control unit 1610 and perform the functions of the control unit 1610 for local monitoring and long range/offsite communication.

In other implementations, the one or more user devices 1640 and 1650 receive monitoring system data captured by the control unit 1610 through the network 1605. The one or more user devices 1640, 1650 may receive the data from the control unit 1610 through the network 1605 or the monitoring server 1660 may relay data received from the control unit 1610 to the one or more user devices 1640 and 1650 through the network 1605. In this regard, the monitoring server 1660 may facilitate communication between the one or more user devices 1640 and 1650 and the monitoring system.

In some implementations, the one or more user devices 1640 and 1650 may be configured to switch whether the one or more user devices 1640 and 1650 communicate with the control unit 1610 directly (e.g., through link 1638) or through the monitoring server 1660 (e.g., through network 1605) based on a location of the one or more user devices 1640 and 1650. For instance, when the one or more user devices 1640 and 1650 are located close to the control unit 1610 and in range to communicate directly with the control unit 1610, the one or more user devices 1640 and 1650 use direct communication. When the one or more user devices 1640 and 1650 are located far from the control unit 1610 and not in range to communicate directly with the control unit 1610, the one or more user devices 1640 and 1650 use communication through the monitoring server 1660.

Although the one or more user devices 1640 and 1650 are shown as being connected to the network 1605, in some implementations, the one or more user devices 1640 and 1650 are not connected to the network 1605. In these implementations, the one or more user devices 1640 and 1650 communicate directly with one or more of the monitoring system components and no network (e.g., Internet) connection or reliance on remote servers is needed.

In some implementations, the one or more user devices 1640 and 1650 are used in conjunction with only local sensors and/or local devices in a house. In these implementations, the system 1600 includes the one or more user devices 1640 and 1650, the sensors 1620, the home automation controls 1622, the camera 1630, and the robotic devices 1690. The one or more user devices 1640 and 1650 receive data directly from the sensors 1620, the home automation controls 1622, the camera 1630, and the robotic devices 1690, and sends data directly to the sensors 1620, the home automation controls 1622, the camera 1630, and the robotic devices 1690. The one or more user devices 1640, 1650 provide the appropriate interfaces/processing to provide visual surveillance and reporting.

In other implementations, the system 1600 further includes network 1605 and the sensors 1620, the home automation controls 1622, the camera 1630, the thermostat 1634, and the robotic devices 1690, and are configured to communicate sensor and image data to the one or more user devices 1640 and 1650 over network 1605 (e.g., the Internet, cellular network, etc.). In yet another implementation, the sensors 1620, the home automation controls 1622, the camera 1630, the thermostat 1634, and the robotic devices 1690 (or a component, such as a bridge/router) are intelligent enough to change the communication pathway from a direct local pathway when the one or more user devices 1640 and 1650 are in close physical proximity to the sensors 1620, the home automation controls 1622, the camera 1630, the thermostat 1634, and the robotic devices 1690 to a pathway over network 1605 when the one or more user devices 1640 and 1650 are farther from the sensors 1620, the home automation controls 1622, the camera 1630, the thermostat 1634, and the robotic devices 1690.

In some examples, the system leverages GPS information from the one or more user devices 1640 and 1650 to determine whether the one or more user devices 1640 and 1650 are close enough to the sensors 1620, the home automation controls 1622, the camera 1630, the thermostat 1634, and the robotic devices 1690 to use the direct local pathway or whether the one or more user devices 1640 and 1650 are far enough from the sensors 1620, the home automation controls 1622, the camera 1630, the thermostat 1634, and the robotic devices 1690 that the pathway over network 1605 is required.

In other examples, the system leverages status communications (e.g., pinging) between the one or more user devices 1640 and 1650 and the sensors 1620, the home automation controls 1622, the camera 1630, the thermostat 1634, and the robotic devices 1690 to determine whether communication using the direct local pathway is possible. If communication using the direct local pathway is possible, the one or more user devices 1640 and 1650 communicate with the sensors 1620, the home automation controls 1622, the camera 1630, the thermostat 1634, and the robotic devices 1690 using the direct local pathway. If communication using the direct local pathway is not possible, the one or more user devices 1640 and 1650 communicate with the sensors 1620, the home automation controls 1622, the camera 1630, the thermostat 1634, and the robotic devices 1690 using the pathway over network 1605.

In some implementations, the system 1600 provides end users with access to images captured by the camera 1630 to aid in decision making. The system 1600 may transmit the images captured by the camera 1630 over a wireless WAN network to the user devices 1640 and 1650. Because transmission over a wireless WAN network may be relatively expensive, the system 1600 can use several techniques to reduce costs while providing access to significant levels of useful visual information (e.g., compressing data, downsampling data, sending data only over inexpensive LAN connections, or other techniques).

In some implementations, a state of the monitoring system and other events sensed by the monitoring system may be used to enable/disable video/image recording devices (e.g., the camera 1630). In these implementations, the camera 1630 may be set to capture images on a periodic basis when the alarm system is armed in an "away" state, but set not to capture images when the alarm system is armed in a "home" state or disarmed. In addition, the camera 1630 may be triggered to begin capturing images when the alarm system detects an event, such as an alarm event, a door-opening event for a door that leads to an area within a field of view of the camera 1630, or motion in the area within the field of view of the camera 1630. In other implementations, the camera 1630 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A circuit for powering a video doorbell in signal communication with a chime that outputs audio in response to a button on the video doorbell being pressed, the circuit comprising:
    a switch coupled to a set of input power wires that supply power to the circuit from a source, wherein the switch is operable to switch between:
    i) a first path of the circuit that supplies power to the video doorbell using the set of input power wires; and ii) a second path of the circuit that supplies power to the chime using the set of input power wires;
    a detector configured to generate a detection signal indicating a change in polarity of an alternating-current (AC) voltage signal corresponding to when a value of the AC voltage signal changes from 0 volts; a controller configured to:
    i) generate, based on the detection signal, a timed pulse signal in response to sampling the AC voltage signal for the change in polarity of the AC voltage signal; and ii) control, based on the timed pulse signal and in response to the button being pressed, a timing of switching iterations of the switch to iteratively switch between the first path and the second path to concurrently power the video doorbell and the chime;
    wherein the circuit is configured to concurrently power the video doorbell and the chime without relying on battery power at the video doorbell based on the timing of the switching iterations.

2. The circuit of claim 1, wherein the circuit is configured to:
    concurrently power the video doorbell and the chime without relying on battery power at the video doorbell, in response to the button on the video doorbell being pressed and for the duration of the audio output by the chime.

3. The circuit of claim 2, wherein:
    iteratively switching between the first path and the second path corresponds to a power sharing technique that allows for splitting power between the chime and the video doorbell in response to the button on the video doorbell being pressed and for the duration of the audio output by the chime.

4. The circuit of claim 3, further comprising:
a rectifier circuit coupled to a capacitor configured to store energy based on a voltage signal generated by the rectifier circuit, wherein the energy stored at the capacitor is used to power the video doorbell without relying on battery power in response to the button on the video doorbell being pressed.

5. The circuit of claim 4, wherein:
the source is an AC transformer that generates the AC voltage signal;
the rectifier circuit generates a rectified DC voltage signal from the AC voltage signal;
and the capacitor stores energy based on the rectified DC voltage signal to power the video doorbell for a threshold duration of time without relying on battery power at the video doorbell.

6. The circuit of claim 1, wherein the detection signal further indicates
a peak value of the AC voltage signal; or
a minimum value of the AC voltage signal.

7. The circuit of claim 6, wherein the controller:
receives the detection signal generated by the detector; and
determines the timing metric based on the detection signal.

8. The circuit of claim 6, wherein the controller:
generates a control signal, wherein a timing of the control signal is based on the timing metric; and controls the switch to iteratively switch between the first path and the second path based on the timing of the control signal.

9. The circuit of claim 8, wherein:
a timing of the timed pulse signal is non-synchronized to an input waveform of the AC voltage signal.

10. The circuit of claim 8 wherein the controller:
based on the detection signal, samples the AC voltage signal for a zero crossing that corresponds to the change in polarity of the AC voltage signal; and synchronizes a timing of the
timed pulse signal to a frequency of the AC voltage signal in response to sampling the AC voltage signal for the zero crossing.

11. The circuit of claim 10, wherein the frequency is based on a plurality of cycles of the AC voltage signal and the controller:
synchronizes a timing of the timed pulse signal to one-half of a respective cycle of the plurality of cycles of the AC voltage signal in response to sampling the AC voltage signal for the zero crossing.

12. The circuit of claim 11, wherein the switch:
closes to cause a short at the set of input power wires to supply power to the chime; and
opens to cause an open at the set of input power wires to supply power to the chime.

13. The circuit of claim 12, wherein the circuit is configured to:
close the switch to short an input to the video doorbell during a first half of a first cycle to supply power to the chime; and open the switch during a second half of the first cycle to supply power to the video doorbell.

14. The circuit of claim 1, wherein the controller:
determines a ratio of voltage and power required to operate the video doorbell for a duration of the audio output by the chime; and generates a control signal that is a switching pulse applied to the switch to supply the ratio of voltage and power required to operate the video doorbell.

15. The circuit of claim 1, wherein the chime is an electronic chime that causes the video doorbell to require power for a duration of time that the electronic chime outputs audio in response to the button on the video doorbell being pressed or in response to detection of an object by the video doorbell.

16. A method implemented using a circuit for powering a video doorbell in signal communication with a chime that outputs audio in response to a button on the video doorbell being pressed, the method comprising:
supplying, from a source, power at the circuit using a switch coupled to a set of input power wires, wherein the switch is operable to switch between:
i) a first path of the circuit that supplies power to the video doorbell using the set of input power wires; and ii) a second path of the circuit that supplies power to the chime using the set of input power wires;
generating, by a detector, a detection signal indicating a change in polarity of an alternating-current (AC) voltage signal corresponding to when a value of the AC voltage signal changes from 0 volts; generating, by a controller and based on the detection signal, a timed pulse signal in response to sampling the AC voltage signal for the change in polarity of the AC voltage signal; controlling, based on the timed pulse signal, a timing of switching iterations of the switch to iteratively switch between the first path and the second path; and in response to the button being pressed, concurrently powering the video doorbell and the chime without relying on battery power at the video doorbell, based on the timing of the switching iterations.

17. The method of claim 16, comprising:
based on the iterative switching between the first path and the second path, concurrently powering the video doorbell and the chime without relying on battery power at the video doorbell, in response to the button on the video doorbell being pressed and for the duration of the audio output by the chime.

18. The method of claim 17, wherein:
iteratively switching between the first path and the second path corresponds to a power sharing technique that allows for splitting voltage and power between the chime and the video doorbell in response to the button on the video doorbell being pressed and for the duration of the audio output by the chime.

19. The method of claim 18, comprising:
storing, using a rectifier circuit coupled to a capacitor, energy at the capacitor based on a voltage signal generated by the rectifier circuit, wherein the energy stored at the capacitor is used to power the video doorbell without relying on battery power in response to the button on the video doorbell being pressed.

20. A circuit for powering a video doorbell in signal communication with a chime that outputs audio in response to detection of an object by the video doorbell, the circuit comprising:
a switch coupled to a set of input power wires that supply power to the circuit from a source, wherein the switch is operable to switch between:
i) a first path of the circuit that supplies power to the video doorbell using the set of input power wires; and ii) a second path of the circuit that supplies power to the chime using the set of input power wires;
a detector configured to generate a detection signal indicating a change in polarity of an alternating-current (AC) voltage signal corresponding to when a value of the AC voltage signal changes from 0 volts; a controller configured to:
i) generate, based on the detection signal, a timed pulse signal in response to sampling the AC voltage signal for the change in polarity of the AC voltage signal; and ii) control, based on the timed pulse signal and in response to detection of the object by the video doorbell, a timing of switching iterations of the switch to iteratively switch between the first path and the second path to concurrently power the video doorbell and the chime;

wherein the circuit is configured to concurrently power the video doorbell and the chime without relying on battery power at the video doorbell based on the timing of the switching iterations.

* * * * *